United States Patent
Sasaki et al.

(10) Patent No.: US 6,715,474 B1
(45) Date of Patent: Apr. 6, 2004

(54) INTERNAL COMBUSTION ENGINE

(75) Inventors: Shizuo Sasaki, Toyota (JP); Masato Gotoh, Toyota (JP); Takekazu Ito, Toyota (JP); Kouji Yoshizaki, Toyota (JP); Hiroki Murata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/831,559

(22) PCT Filed: Oct. 27, 1999

(86) PCT No.: PCT/JP99/05948

§ 371 (c)(1),
(2), (4) Date: Jul. 3, 2001

(87) PCT Pub. No.: WO00/29735

PCT Pub. Date: May 25, 2000

(30) Foreign Application Priority Data

Nov. 12, 1998 (JP) .......................... 10-322522

(51) Int. Cl.$^7$ .......................... F02M 25/07; F02B 17/00
(52) U.S. Cl. .................. 123/568.21; 123/595
(58) Field of Search ............. 123/568.21, 568.26, 123/568.27, 305, 295, 435, 436; 60/277, 276, 274

(56) References Cited

U.S. PATENT DOCUMENTS

| 4,805,571 A | 2/1989 | Humphrey |
| 4,932,370 A | 6/1990 | Schierling et al. |
| 5,095,873 A | 3/1992 | Motoyama et al. |
| 5,743,243 A | 4/1998 | Yanagihara |
| 5,937,639 A | 8/1999 | Sasaki et al. |
| 6,142,119 A | * 11/2000 | Abe et al. .................. 123/435 |
| 6,240,723 B1 | * 6/2001 | Ito et al. ............... 123/568.21 |

FOREIGN PATENT DOCUMENTS

| JP | 8-303309 A | 11/1996 |
| JP | 9-287528 A | 11/1997 |
| JP | 9-305850 A | 11/1997 |
| JP | 11-22535 A | 1/1999 |
| JP | 11-107820 A | 4/1999 |
| JP | 11-153049 A | 6/1999 |

* cited by examiner

Primary Examiner—Tony M. Argenbright
Assistant Examiner—Arnold Castro
(74) Attorney, Agent, or Firm—Oliff & Berridge, PLC

(57) ABSTRACT

An engine where first combustion where the amount of the EGR gas in the combustion chamber is larger than the amount of EGR where the amount of production of soot peaks and almost no soot is produced and a second combustion where the amount of EGR gas in the combustion chamber (5) is smaller than the amount of EGR gas where the amount of production of soot peaks are selectively switched between. When switching between the first combustion and second combustion, the injection timing is delayed until after top dead center of the compression stroke,

13 Claims, 17 Drawing Sheets

Fig.1
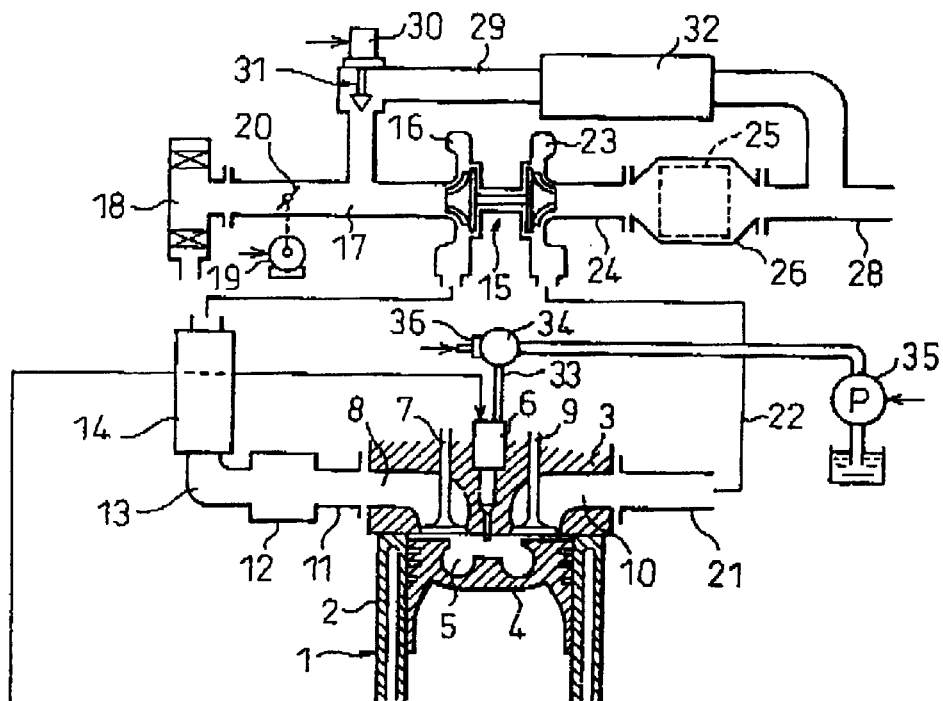
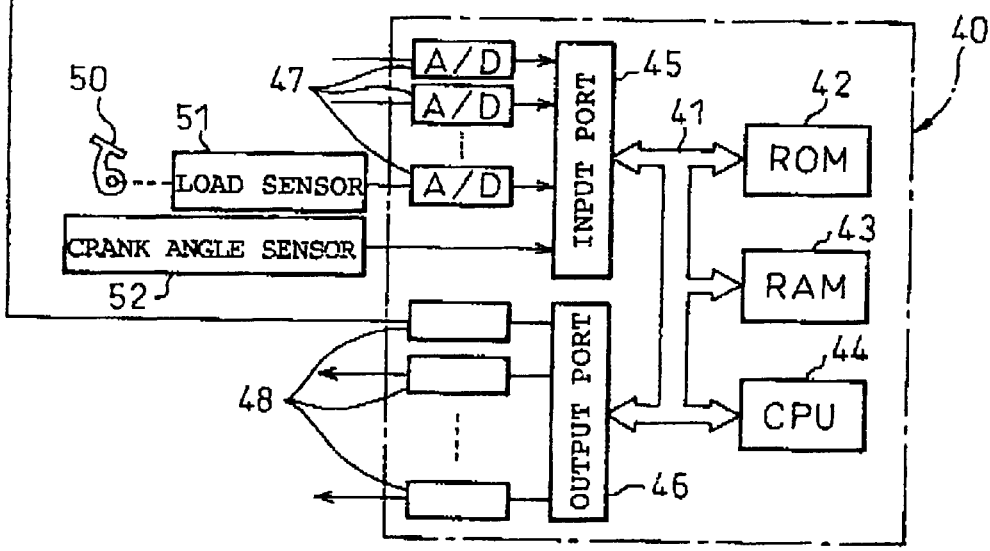

Fig. 3A
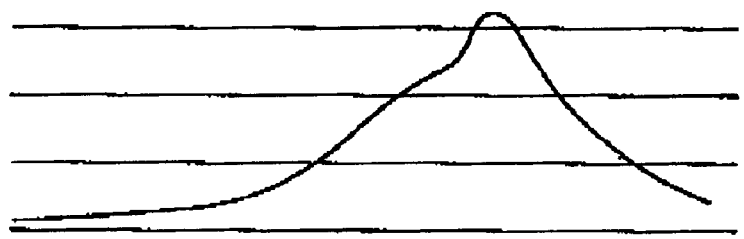
Fig. 3B
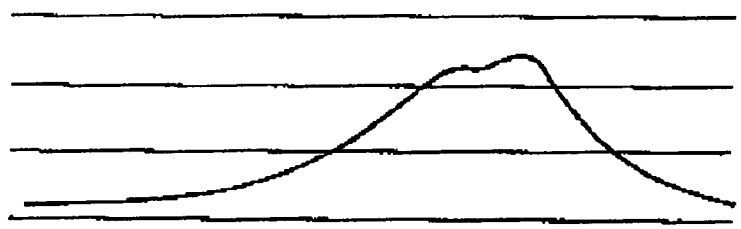
Fig. 4
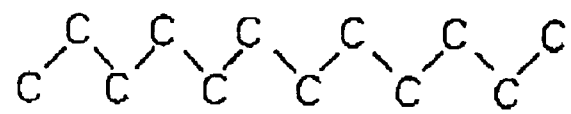
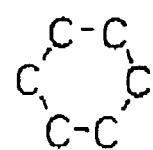 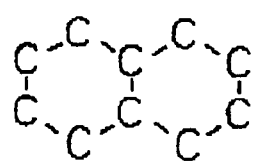

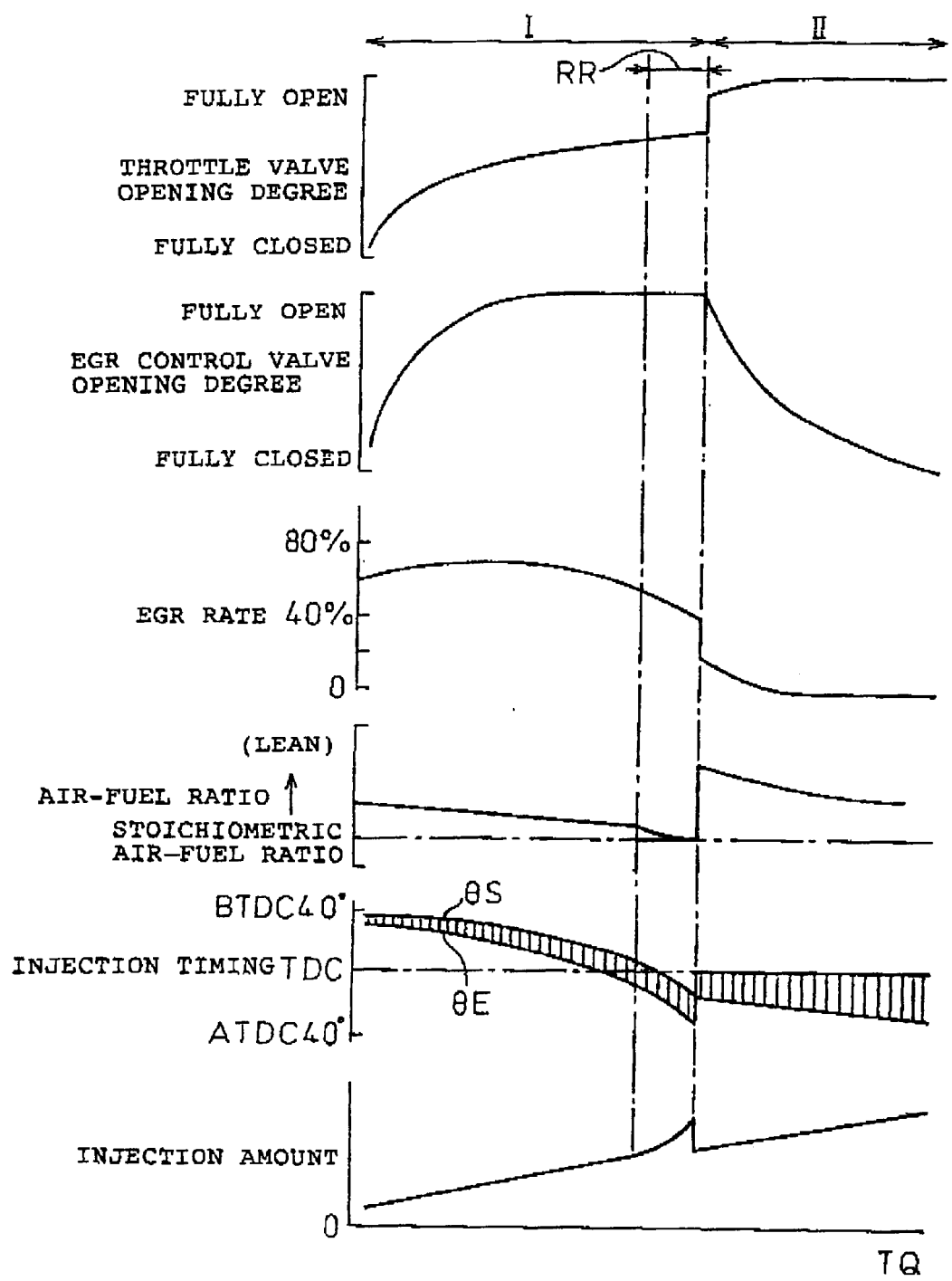

INTERNAL COMBUSTION ENGINE

TECHNICAL FIELD

The present invention relates to an internal combustion engine.

BACKGROUND ART

In the past, in an internal combustion engine, for example, a diesel engine, the production of $NO_x$ has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas + amount of intake air), the lower the combustion temperature in the combustion chamber. When the combustion temperature falls, the amount of $NO_x$ produced falls and therefore the higher the EGR rate, the lower the amount of $NO_x$ produced.

In this way, in the past, it was known that the higher the EGR rate, the lower the amount of $NO_x$ produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit. The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set within a range not exceeding that maximum allowable limit so that the amount of $NO_x$ and smoke produced would become as small as possible. Even if the EGR rate is set in this way so that the amount of $NO_x$ and smoke produced becomes as small as possible, however, there are limits to the reduction of the amount of production of $NO_x$ and smoke. In practice, therefore, a considerable amount of $NO_x$ and smoke continues being produced.

In the process of studying the combustion in diesel engines, however, it was discovered that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGA rate is made at least 70 percent during engine idling or if the EGR gas is force cooled and the EGR rate is made at least 55 percent or so, the smoke will almost completely disappear, that is, almost no soot will be produced. Further, it was found that the amount of $NO_x$ produced at this time was extremely small. Further studies were engaged in later based on this discovery to determine the reasons why soot was not produced and as a result a new system of combustion able to simultaneously reduce the soot and $NO_x$ more than ever before was constructed. This new system of combustion will be explained in detail later, but briefly it is based on the idea of stopping the growth of hydrocarbons into soot at an intermediate stage before the hydrocarbons grow into soot.

That is, what was found from repeated experiments and research was that the growth of hydrocarbons stops at an intermediate stage before becoming soot when the temperature of the fuel and the surrounding gas at the time of combustion in the combustion chamber is lower than a certain temperature and the hydrocarbons grow to soot all at once when the temperature of the fuel and the surrounding gas becomes higher than a certain temperature. In this case, the temperature of the fuel and the surrounding gas is greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperature of the fuel and the surrounding gas.

Therefore, if the temperature of the fuel and the surrounding gas at the time of combustion in the combustion chamber is suppressed to no more than a temperature at which the growth of the hydrocarbons stops midway, soot is no longer produced. The temperature of the fuel and the surrounding gas at the time of combustion in the combustion chamber can be suppressed to no more than a temperature at which the growth of the hydrocarbons stops midway by adjusting the amount of heat absorbed by the gas around the fuel. On the other hand, the hydrocarbons stopped in growth midway before becoming soot can be easily removed by aftertreatment using an oxidation catalyst etc. This is the basic thinking behind this new system of combustion. A patent application for an internal combustion engine using this new combustion system has already been filed by the applicant (Japanese Patent Application No. 9-305850).

In this new system of combustion, however, the EGR rate must be made at least about 55 percent. The EGR rate can be made at least about 55 percent when the amount of suction air is relatively small. That is, this new combustion is not possible when the amount of suction air exceeds a certain level. Therefore, when the amount of suction air exceeds a certain level, it is necessary to switch to the conventionally performed combustion. In this case, if the EGR rate is lowered to switch to the conventionally performed combustion, the EGR rate will pass the range of the EGR rate where the amount of smoke produced peaks, so a large amount of smoke will be produced.

If the injection timing is delayed until after top dead center of the compression stroke under this new combustion system, however, since the temperature in the combustion chamber falls around when the injection is performed, the temperature of the fuel and its surrounding gas will not rise that much at the time of combustion. Therefore, at this time, it is found that the peak value of the amount of smoke produced becomes smaller. Therefore, it the injection timing is delayed until after top dead center of the compression stroke when switching from this new combustion to the conventionally performed combustion, it becomes possible to suppress the amount of smoke produced at the time of switching.

SUMMARY OF THE INVENTION

An object of the present invention is to provide an internal combustion engine capable of suppressing the generation of smoke when switching between new combustion and the conventionally performed combustion.

According to the present invention, there is provided an internal combustion engine in which an amount of production of soot gradually increases and then peaks when an amount of inert gas in a combustion chamber increases and in which a further increase of the amount of inert gas in the combustion chamber results in a temperature of fuel and surrounding gas in the combustion chamber becoming lower than a temperature of production of soot and therefore almost no production of soot any longer, the engine comprising switching means for selectively switching between a first combustion where the amount of inert gas in the combustion chamber is higher than the amount of inert gas where the amount of production of soot peaks and where almost no soot is produced and a second combustion where the amount of inert gas in the combustion chamber is smaller than the amount of inert gas where the amount of production of soot peaks, an injection timing being delayed to after top dead center of the combustion stroke when switching between the first combustion and second combustion.

BRIEF DESCRIPTION OF THE DRAWINGS

FIG. 1 is an overall view of a compression ignition type internal combustion engine;

FIGS. 3A and 3B are views of the combustion pressure;

FIG. 4 is a view of a fuel molecule;

FIG. 9 is a view of the opening degree of a throttle valve etc.;

DESCRIPTION OF THE PREFERRED EMBODIMENTS

Figure 2:
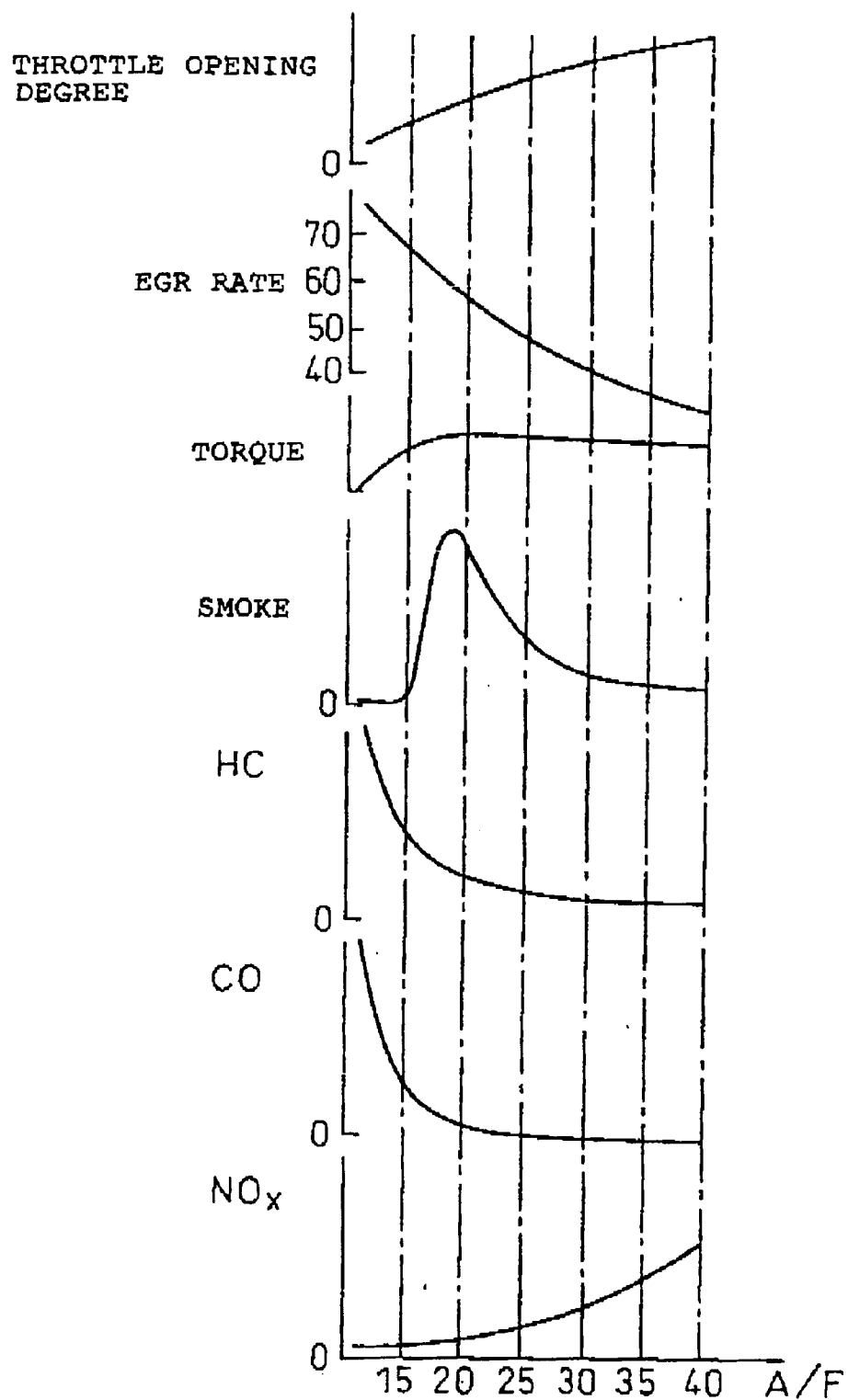
FIG. 2 is a view of the amount of generation of smoke and $NO_x$.

FIG. 1 is a view of the case of application of the present invention to a four-stroke compression ignition type internal combustion engine.

Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 and intercooler 14 to a supercharger, for example, the exit part of a compressor 16 of an exhaust turbocharger 15. The entrance part of the compressor 16 is connected through an air intake pipe 17 to an air cleaner 18. A throttle valve 20 driven by a step motor 19 is arranged in the air intake pipe 17.

On the other hand, the exhaust port 10 is connected through an exhaust manifold 21 and exhaust tube 22 to the entrance part of an exhaust turbine 23 of the exhaust turbocharger 15. The exit part of the exhaust turbine 23 is connected through an exhaust pipe 24 to a catalytic converter 26 housing an $NO_x$ absorbent 25.

The exhaust pipe 28 connected to the exit part of the catalytic converter 26 and the air intake pipe 17 downstream of the throttle valve 20 are connected to each other through an EGR passage 29. In the EGR passage 29 is arranged an EGR control valve 31 driven by a step motor 30. Further, in the EGR passage 29 is arranged an intercooler 32 for cooling the EGR gas flowing through the EGR passage 29. In the embodiment shown in FIG. 1, the engine cooling water is led into the intercooler 32 and that engine cooling water used to cool the EGR gas.

On the other hand, each fuel injector 6 is connected through a fuel supply line 33 to a fuel reservoir, that is, a common rail 34. Fuel is supplied to the common rail 34 from an electrically controlled variable discharge fuel pump 35. Fuel supplied in the common rail 35 is supplied through the fuel supply lines 33 to the fuel injectors 6. A fuel pressure sensor 36 for detecting the fuel pressure in the common rail 34 is attached to the common rail 34. The amount of discharge of the fuel pump 35 is controlled based on the output signal of the fuel pressure sensor 36 so that the fuel pressure in the common rail 34 becomes the target fuel pressure.

The electronic control unit 40 is comprised of a digital computer and is provided with a ROM (read only memory) 42, a RAM (random access memory) 43, a CPU (microprocessor) 44, an input port 45, and an output port 46 connected with each other by a bidirectional bus 41. The output signal of the fuel pressure sensor 36 is input through a corresponding AD converter 47 to the input port 45. The accelerator pedal 50 has connected to it a load sensor 51 for generating an output voltage proportional to the amount of depression L of the accelerator pedal 50. The output voltage of the load sensor 51 is input through a corresponding AD converter 47 to the input port 45. Further, the input port 45 has connected to it a crank angle sensor 52 for generating an output pulse each time the crankshaft rotates by for example 30°. On the other hand, the output port 46 has connected to it through a corresponding drive circuit 48 the fuel injectors 6, throttle valve control step motor 19, EGR control valve control step motor 30, and fuel pump 35.

FIG. 2 shows an example of an experiment showing the changes in the output torque when changing the air fuel ratio A/F (abscissa in FIG. 2) by changing the opening degree of the throttle valve 20 and the EGR rate at the time of engine low load operation and the changes in the amount of emission of smoke, HC, CO, and $NO_x$. As will be understood from FIG. 2, in this experiment, the EGR rate becomes larger the smaller the air fuel ratio A/F. When below the stoichiometric air fuel ratio ($\approx$14.6), the EGR rate becomes over 65 percent.

As shown in FIG. 2, if increasing the EGR rate to reduce the air fuel ratio A/F, when the EGR rate becomes close to 40 percent and the air fuel ratio A/F becomes 30 or so, the amount of smoke produced starts to increase. Next, when the EGR rate is further raised and the air fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air fuel ratio A/F becomes close to 15.0, the smoke produced becomes substantially zero. That is, almost no soot is produced any longer. At this time, the output torque of the engine falls somewhat and the amount of $NO_x$ produced becomes considerably lower. On the other hand, at this time, the amounts of HC and CO produced start to increase.

FIG. 3A shows the changes in compression pressure in the combustion chamber 5 near an air fuel ratio A/F of 21 when the amount of smoke produced is the greatest. FIG. 3B shows the changes in compression pressure in the combustion chamber 5 near an air fuel ratio A/F of 18 when the amount of smoke produced is substantially zero. As will be understood from a comparison of FIG. 3A and FIG. 3B, the combustion pressure is lower in the case shown in FIG. 38 where the amount of smoke produced is substantially zero than the case shown in FIG. 3A where the amount of smoke produced is large.

The following may be said from the results of the experiment shown in FIG. 2 and FIGS. 3A and 3B. That is, first, when the air fuel ratio A/F is less than 15.0 and the amount of smoke produced is substantially zero, the amount of $NO_x$ produced falls considerably as shown in FIG. 2. The fact that the amount of $NO_x$ produced falls means that the combustion temperature in the combustion chamber 5 falls. Therefore, it can be said that when almost no soot is produced, the combustion temperature in the combustion chamber 5 becomes low. The same thing may be said from FIG. 3. That is, in the state shown in FIG. 3B where almost no soot is produced, the combustion pressure becomes low, therefore the combustion temperature in the combustion chamber 5 becomes low at this time.

Second, when the amount of smoke produced, that is, the amount of soot produced, becomes substantially zero, as shown in FIG. 2, the amounts of emission of HC and CO increase. This means that the hydrocarbons are exhausted without growing into soot. That is, the linear hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the surrounding gas in the combustion chamber 5 is below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air fuel ratio, and the compression ratio, so it cannot be said what degree it is, but this certain temperature is deeply related with the amount of production of $NO_x$. Therefore, this certain temperature can be defined to a certain degree from the amount of production of $NO_x$. That is, the greater the EGR rate, the lower the temperature of the fuel and the gas surrounding it at the time of combustion and the lower the amount of $NO_x$ produced. At this time, when the amount of $NO_x$ produced becomes around 10 ppm or less, almost no soot is produced any more. Therefore, the above certain temperature substantially matches the temperature when so the amount of $NO_x$ produced becomes 10 ppm or less.

Once soot is produced, it is impossible to remove it by after-treatment using a catalyst having an oxidation function. As opposed to this, a soot precursor or a state of hydrocarbons before this can be easily removed by after-treatment using a catalyst having an oxidation function. Considering after-treatment by a catalyst having an oxidation function, there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by a catalyst having an oxidation function.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperature of the fuel and the gas around it to a temperature lower than the temperature at which soot is produced, an amount of inert gas enough to absorb an amount of heat sufficient for lowering the temperature is required. Therefore, if the amount of fuel increases, the amount of inert gas required increases along with the same. Note that in this case, the larger the specific heat of the inert gas, the stronger the heat absorbing action. Therefore, the inert gas is preferably a gas with a large specific heat. In this regard, since $CO_2$ and EGR, gas have relatively large specific heats, it may be said to be preferable to use EGR gas as the inert gas.

Figure 5:
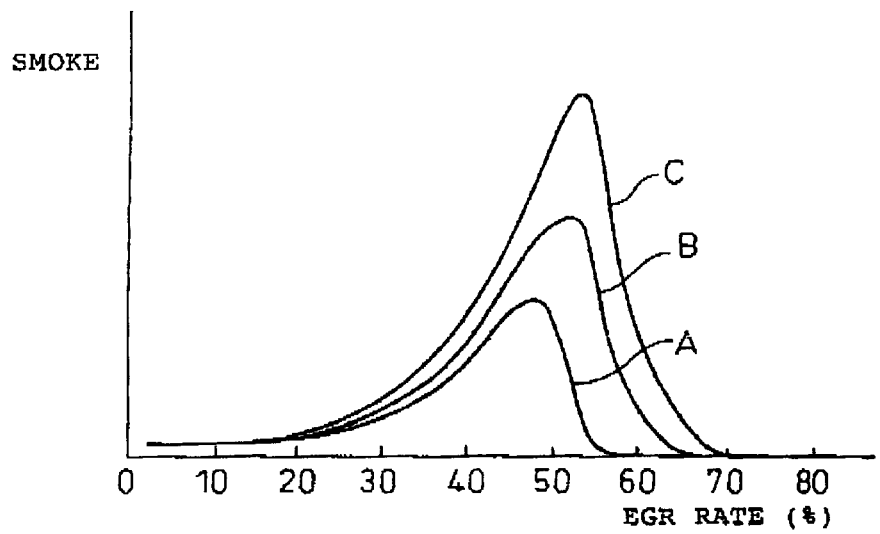
FIG. 5 is a view of the relationship between the amount of generation of smoke and the EGR rate.

FIG. 5 shows the relationship between the EGR rate and smoke when using EGR gas as the inert gas, making the injection timing before top dead center of the compression stroke, and changing the degree of cooling of the EGR gas. That is, the curve A in FIG. 5 shows the case of force cooling the EGR gas and maintaining the temperature of the EGR gas at about 90° C., curve B shows the case of cooling the EGR gas by a compact cooling apparatus, and curve C shows the case of not force cooling the EGR gas.

When force cooling the EGR gas as shown by the curve A in FIG. 5, the amount of soot produced peaks when the EGR rate is a little under 50 percent. In this case, if the EGR rate is made about 55 percent or higher, almost no soot is produced any longer.

On the other hand, when the EGR gas is slightly cooled as shown by curve B in FIG. 5, the amount of soot produced peaks when the EGR rate is slightly higher than 50 percent. In this case, if the EGR rate is made above about 65 percent, almost no soot is produced any longer.

Further, when the EGR gas is not force cooled as shown by curve C in FIG. 5, the amount of soot produced peaks near an EGR rate near 55 percent. In this case, if the EGR rate is made over about 70 percent, almost no soot is produced any longer.

Note that FIG. 5 shows the amount of smoke produced when the engine load is relatively high. When the engine load becomes small, the EGR rate at which the amount of soot produced peaks falls somewhat and the lower limit of the EGR rate at which almost no soot is produced any longer falls somewhat. In this way, the lower limit of the EGR rate at which almost no soot is produced any longer changes in accordance with the degree of cooling of the EGR gas or the engine load.

Figure 6:
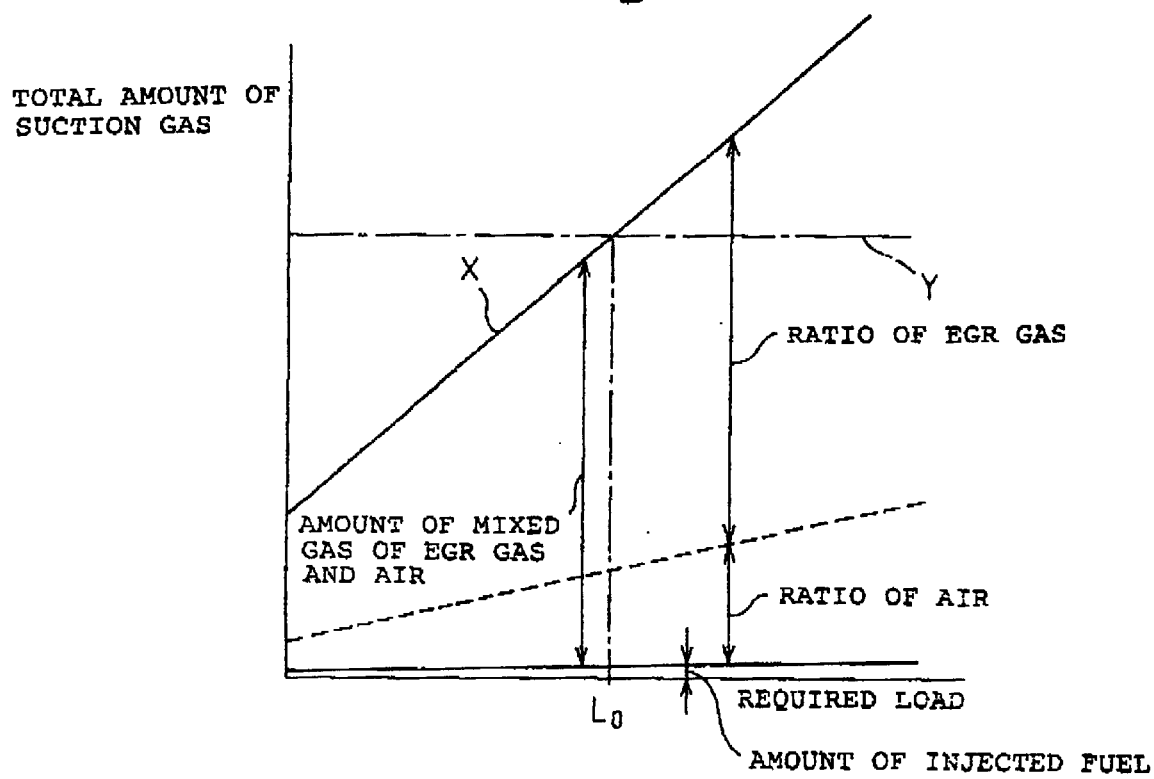
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas required for making the temperature of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air fuel ratio. On the other hand, in FIG. 6, the ratio of EGR gas, that is, the amount of EGR gas in the mixed gas, shows the minimum amount of EGR gas required for making the temperature of the fuel and the gas around it a temperature lower than the temperature at which soot is produced. This amount of EGR gas is, expressed in terms of the EGR rate, at least 55 percent—in the embodiment shown in FIG. 6, at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperature of the fuel and the gas around it becomes a temperature lower than the temperature at which soot is produced and therefore no soot at all is produced any longer. Further, the amount of $NO_x$ produced at this time is around 10 ppm or less and therefore the amount of $NO_x$ produced becomes extremely small.

If the amount of fuel injected increases, the amount of heat generated at the time of combustion increases, so to maintain the temperature of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

When supercharging is not performed, however, the upper limit of the total amount X of suction gas sucked into the combustion chamber 5 is Y. Therefore, in the region where the required load is larger than $L_0$ in FIG. 6, it is not possible to maintain the air-fuel ratio at the stoichiometric air-fuel ratio so long as the ratio of the EGR gas is not reduced along with the increase of the required load. In other words, when supercharging is not being performed, when trying to maintain the air-fuel ratio at the stoichiometric air-fuel ratio at the region where the required load is larger than $L_0$, the EGR rate falls along with the increase of the required load, therefore in the region where the required load is larger than $L_0$, the temperature of the fuel and its surrounding gas can no longer be maintained at a temperature lower than the temperature where soot is produced.

However, as shown in FIG. 1, if EGR gas is recirculated at the entrance side of the supercharger through the EGR passage 29, that is, in the air intake pipe 17 of the exhaust turbocharger 15, it is possible to maintain the EGR rate at over 55 percent, for example, at 70 percent, in the region where the required load is larger than $L_0$ and therefore it is possible to maintain the temperature of the fuel and its surrounding gas at a temperature lower than the temperature where soot is produced. That is, if EGR gas is recirculated so that the EGR rate in the air intake pipe 17 becomes for example 70 percent, the EGR rate of the suction gas raised in pressure by the compressor 16 of the exhaust turbocharger 15 also becomes 70 percent and therefore it is possible to maintain the temperature of the fuel and its surrounding gas at a temperature lower than the temperature where soot is produced up to the limit to which the pressure can be raised by the compressor 16. Therefore, it becomes possible to enlarge the operating region of the engine where low temperature combustion can be performed.

Note that in this case, when making the EGR rate more than 55 percent in the region where the required load is larger than L₀, the EGR control valve 31 in fully opened and the throttle valve 20 is closed somewhat.

As explained above, FIG. 6 shows the case of combustion of fuel at the stoichiometric air fuel ratio. Even if the amount of air is made smaller than the amount of air shown in FIG. 6, however, that is, even if the air fuel ratio is made rich, it is possible to obstruct the production of soot and make the amount of $NO_x$ produced around 10 ppm or less. Further, even if the amount of air is made greater than the amount of air shown in FIG. 6, that is, the mean value of the air fuel ratio is made a lean 17 to 18, it is possible to obstruct the production of soot and make the amount of $NO_x$ produced around 10 ppm or less.

That is, when the air fuel ratio is made rich, the fuel becomes in excess, but since the combustion temperature is suppressed to a low temperature, the excess fuel does not grow into soot and therefore soot is not produced. Further, at this time, only an extremely small amount of $NO_x$ is produced. On the other hand, when the mean air fuel ratio is lean or when the air fuel ratio is the stoichiometric air fuel ratio, a small amount of soot is produced if the combustion temperature becomes higher, but in the present invention, since the combustion temperature is suppressed to a low temperature, no soot at all is produced. Further, only an extremely small amount of $NO_x$ is produced.

In this way, when low temperature combustion is being performed, regardless of the air fuel ratio, that is, whether the air fuel ratio is rich or the stoichiometric air fuel ratio or the mean air fuel ratio is lean, no soot is produced and the amount of $NO_x$ produced becomes extremely small. Therefore, considering the improvement of the fuel consumption rate, it may be said to be preferable to make the mean air fuel ratio lean.

Note that the temperature of the fuel and its surrounding gas at the time of combustion in the combustion chamber can only be suppressed to not more than a temperature where the growth of hydrocarbons stops midway during engine medium or low load operation where the amount of heat generated by the combustion is relatively small. Therefore, in this embodiment of the present invention, at the time of medium or low load operation of the engine, the temperature of the fuel and its surrounding gas at the time of combustion is suppressed to not more than a temperature at which the growth of the hydrocarbons stops midway and first combustion, that is, low temperature combustion, is performed, while at the time of high load operation of the engine, second combustion, that is, the conventionally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7:
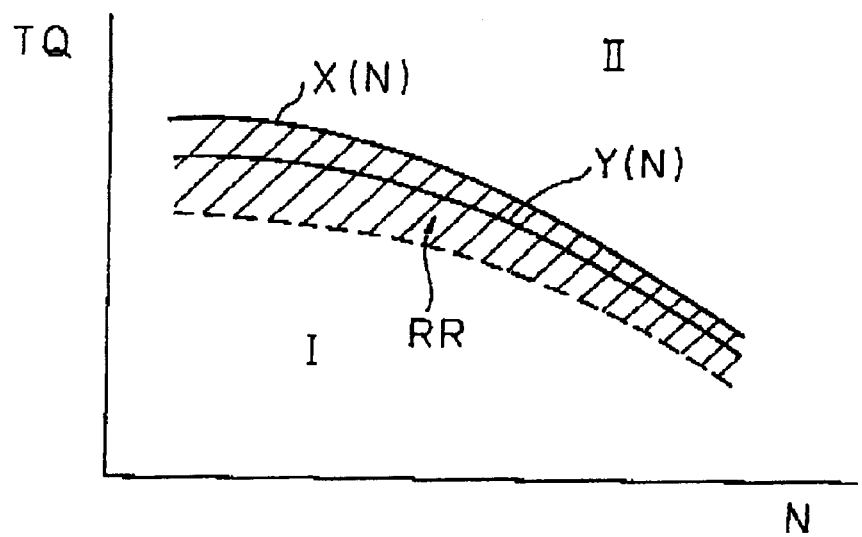
FIG. 7 is a view of a first operating region I and a second operating region II.

FIG. 7 shows a first operating region I where the first combustion, that is, the low temperature combustion, is performed and a second operating region II where the second combustion, that is, the combustion by the conventional combustion method, is performed. Note that in FIG. 7, the ordinate TQ shows the required torque and the abscissa N shows the engine rotational speed N. Further, in FIG. 7, X(N) shows a first boundary between the first operating region I and the second operating region II, and Y(N) shows a second boundary between the first operating region I and the second operating region II. The change of operating regions from the first operating region I to the second operating region II is judged based on the first boundary X(N), while the change of operating regions from the second operating region II to the first operating region I is judged based on the second boundary Y(N).

That is, when the engine operating state is in the first operating region I where the low temperature combustion is being performed, if the required torque TQ exceeds the first boundary X(N), which is a function of the engine rotational speed N, it is judged that the operating region has shifted to the second operating region II and combustion by the conventional combustion method is performed. Next, when the required torque TQ becomes lower than the second boundary Y(N), which is a function of the engine rotational speed N, it is judged that the operating region has shifted to the first operating region I and the low temperature combustion is again performed.

Two boundaries were provided, that is, the first boundary X(N) and the second boundary Y(N) at the lower load side of the first boundary X(N), in this way for the following two reasons. The first reason is that at the high torque side of the second operating region II, the combustion temperature is relatively high and at this time, even if the required torque TQ becomes lower than the first boundary X(N), low temperature combustion cannot be performed immediately. That is, low temperature combustion cannot be started immediately unless the required torque TQ is considerably low, that is, lower than the second boundary Y(N). The second reason is to provide hysteresis with respect to the change in operating regions between the first operating region I and the second operating region II.

On the other hand, in the region RR shown by hatching in FIG. 7, that is in the region RR in the first operating region I where the load is the highest, the air-fuel ratio is made lean or the stoichiometric air-fuel ratio and the injection timing is delayed until after top dead center of the compression stroke. When the engine operating state shifts from the first operating region I to the second operating region II, the region RR is always passed through. This region RR is also always passed through when the engine operating state shifts from the second operating state II to the first operating state I.

When the required torque TQ becomes high, however, that is, when the amount of injection is increased, if fuel is injected before top dead center of the compression stroke, the amount of heat generated will increase, so the temperature of the fuel and its surrounding gas at the time of combustion will become higher. As a result, smoke will be generated.

Figure 8:
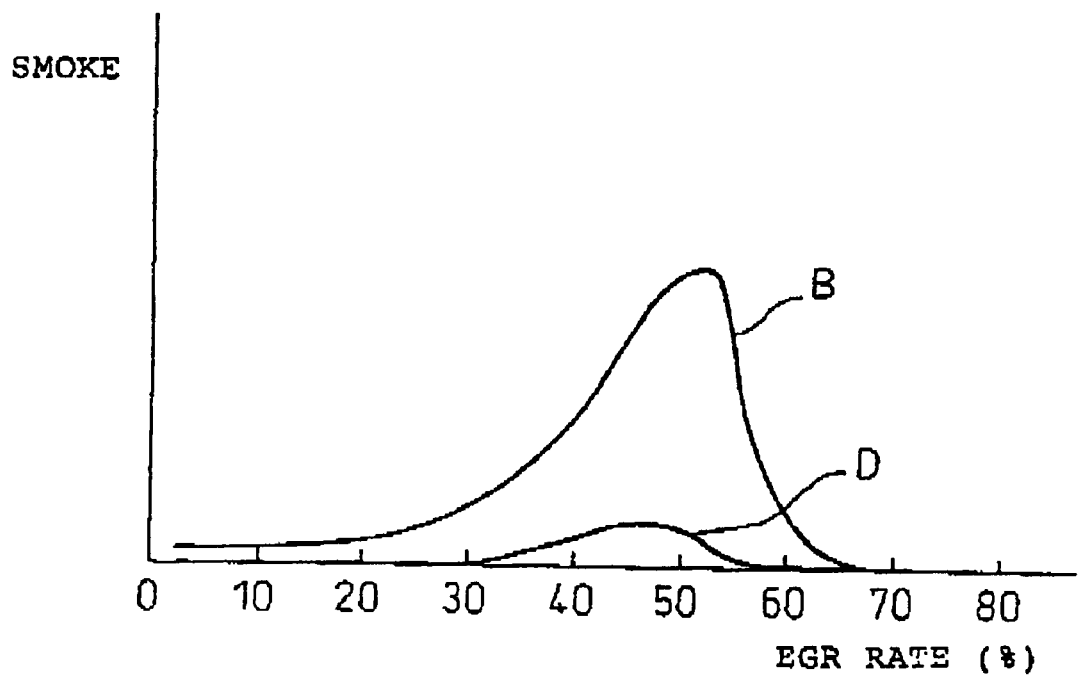
FIG. 8 is a view of the relationship between the amount of production of smoke and the EGR rate.

On the other hand, if top dead center of the compression stroke is passed without injecting fuel, the pressure in the combustion chamber 5 will gradually fall and the temperature in the combustion chamber 5 will gradually drop as well. Therefore, if injecting fuel after top dead center of the compression stroke, even if the amount of injection is large, the temperature of the fuel and its surrounding gas at the time of combustion becomes considerably low and as a result, as shown by D in FIG. 8, the peak value of the amount of smoke produced will become lower and the range of EGR where smoke is produced will become narrower. Note that in FIG. 8, the curve B shows a curve the same as the curve shown in FIG. 5.

Therefore, if the injection timing is delayed until after top dead center of the compression stroke in the region RR of FIG. 7, it becomes possible to suppress the generation of smoke when switching between the first combustion and second combustion. Further, in this case, even if the EGR rate is made not more than 55 percent, it is possible to suppress the generation of smoke.

When the engine operating state is the first operating region I and low temperature combustion is being performed, however, almost no smoke is produced. Instead, the unburned hydrocarbons are exhausted from the combustion chamber 5 in the form of soot precursors or a state before that. At this time, the unburned hydrocarbons exhausted from the combustion chamber 5 can be oxidized well by a catalyst 25 having an oxidation function.

As the catalyst 25, an oxidation catalyst, three-way catalyst, or $NO_x$ absorbent may be used. An $NO_x$ absorbent has the function of absorbing $NO_x$ when the mean air-fuel ratio in the combustion chamber 5 is lean, while releasing $NO_x$ when the mean air-fuel ratio in the combustion chamber 5 becomes rich.

The $NO_x$ absorbent is for example comprised of alumina as a carrier and, on the carrier, for example, at least one of potassium X, sodium Na, lithium Li, cesium Cs, and other alkali metals, barium Ba, calcium Ca, and other alkali earths, lanthanum La, yttrium Y, and other rare earths plus platinum Pt or another precious metal.

An oxidation catalyst, of course, and also a three-way catalyst and an $NO_x$ absorbent have an oxidation function. Therefore, as explained above, it is possible to use a three-way catalyst and $NO_x$ absorbent as the catalyst 25.

Next, an explanation will be made of control of the operation in the first operating region I and the second operating region II referring to FIG. 9.

FIG. 9 shows the opening degree of the throttle valve 20, the opening degree of the EGR control valve 31, the EGR rate, the air-fuel ratio, the injection timing, and the amount of injection with respect to the required torque TQ. As shown in FIG. 9, in the first operating region I with the low required torque TQ, the opening degree of the throttle valve 20 is gradually increased from the fully closed state to the ⅔ opened state as the required torque TQ becomes higher, while the opening degree of the EGR control valve 31 is gradually increased from close to the fully closed state to the fully opened state as the required torque TQ becomes higher. Further, in the example shown in FIG. 9, in the first operating region I other than the region RR, the EGR rate is made at least about 55 percent and the air-fuel ratio is made a slightly lean air-fuel ratio.

In other words, in the first operating region I other than the region RR, the opening degree of the throttle valve 20 and the opening degree of the EGR control valve 31 are controlled so that the EGR rate becomes at least about 55 percent and the air-fuel ratio becomes a slightly lean lean air-fuel ratio. Further, in the first operating region I other than the region RR, the fuel is injected before top dead center TDC of the compression stroke. In this case, the injection start timing θS becomes later the higher the required torque TQ. The injection end timing θE also becomes later the later the injection start timing θS.

Note that during idling operation, the throttle valve 20 is made to close to close to the fully closed state. At this time, the EGR control valve 31 is also made to close to close to the fully closed state. If the throttle valve 20 is closed to close to the fully closed state, the pressure in the combustion chamber 5 at the start of compression will become low, so the compression pressure will become small. If the compression pressure becomes small, the amount of compression work by the pistons 4 becomes small, so the vibration of the engine body 1 becomes smaller. That is, during idling operation, the throttle valve 20 can be closed to close to the fully closed state to suppress vibration in the engine body 1.

In the region RR, the injection start timing θS is delayed more the larger the required torque TQ. In the high required torque side of the region RR, the injection start timing θS becomes after top dead center. Further, in the region RR, the air-fuel ratio is gradually made smaller from the lean air-fuel ratio to the stoichiometric air-fuel ratio as the required torque TQ becomes larger, while the EGR rate is made lower as the required torque TQ becomes larger. Further, in this region RR, to make the air-fuel ratio smaller as the required torque TQ becomes larger, the amount of injection can be increased.

On the other hand, if the engine operating state changes from the first operating region I to the second operating region II, the opening degree of the throttle valve 20 is increased in a step-like manner from the ⅔ opened state to the fully opened state. At this time, in the example shown in FIG. 9, the EGR rite is reduced in a step-like manner from about 40 percent to less than 20 percent and the air-fuel ratio is increased in a step-like manner.

In the second operating region II, the second combustion, that is, the conventionally performed combustion, is performed. In the second operating region II, the throttle valve 20 is held in the fully opened state except for a certain part and the opening degree of the EGR control valve 31 is gradually made smaller then higher the required torque TQ. Therefore, in the operating region II, the EGR rate becomes lower the higher the required torque TQ and the air-fuel ratio becomes smaller then higher the required torque. Even if the required torque TQ becomes high, however, the air-fuel ratio is made a lean air-fuel ratio. Further, in the second operating region II, the injection start timing θS is made before top dead center TDC of the compression stroke.

Figure 10A:
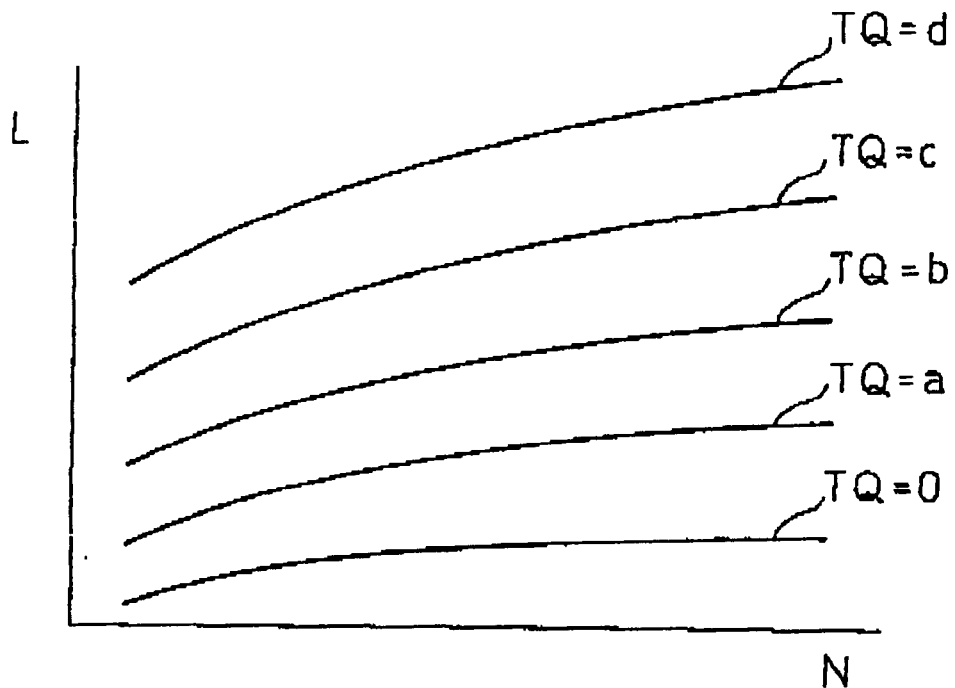
FIGS. 10A and 10B are views of the required load.
Figure 10B:
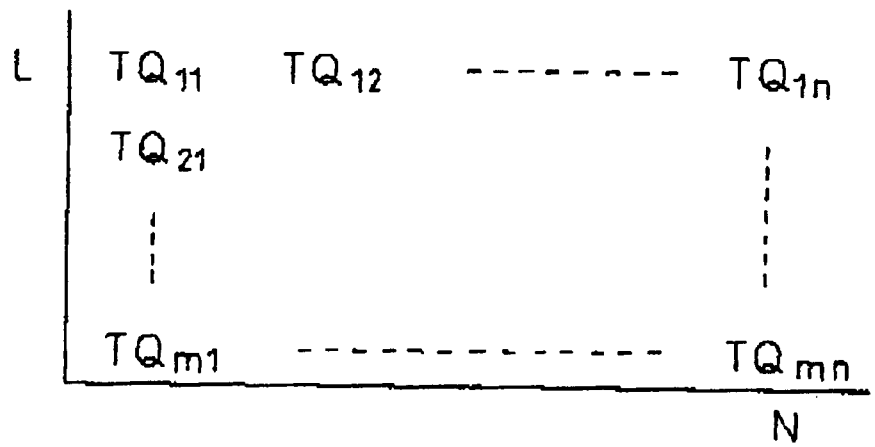

FIG. 10A shows the relationship between the required torque TQ, the amount of depression L of the accelerator pedal 50, and the engine rotational speed N. Note that in FIG. 10A, the curves show equivalent torque curves. The curve shown by TQ=0 shows that the torque is zero, while the remaining curves have gradually higher required torques in the order of TQ=a, TQ=b, TQ=c, and TQ=d. The required torques TQ shown in FIG. 10A are stored in the ROM 42 in advance in the form of a map as a function of the amount of depression L of the accelerator pedal 50 and the engine rotational speeded N as shown in FIG. 10B. In the present invention, the required torque TQ is first calculated in accordance with the amount of depression L of the accelerator pedal 50 and the engine rotational speed N from the map shown in FIG. 10B and then the amount of fuel injection etc. are calculated based on the required torque TQ.

Figure 11:
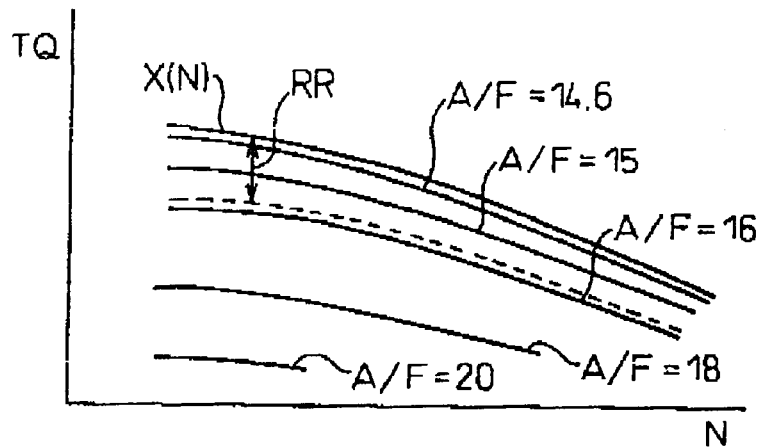
FIG. 11 is a view of the air-fuel ratio in the first operating region I.

FIG. 11 shows the air-fuel ratio A/F in the first operating region I. In FIG. 11, the curves shown by A/F=14.6, A/F=15, A/F=16, A/F=18, and A/P=20 show when the air-fuel ratio is 14.6 (stoichiometric air-fuel ratio), 15, 16, 18, and 20, respectively. The air-fuel ratios between the curves are determined by proportional distribution. As shown in FIG. 11, in the first operating region I other than the region RR, the air-fuel ratio becomes lean. Further, in the first operating region I, the air-fuel ratio A/F is made lean the lower the required torque TQ becomes, That is, the lower the required torque TQ becomes, the smaller the amount of heat generated by the combustion. Therefore, even if reducing the EGR rate the lower the required torque TQ becomes, low temperature combustion becomes possible. If the EGR rate is reduced, the air-fuel ratio becomes larger and therefore, as shown in FIG. 11, the air-fuel ratio A/P is made larger the lower the required torque TQ. The larger the air-fuel ratio A/F becomes, the more the fuel consumption efficiency is improved. Therefore, to make the air-fuel ratio as lean as possible, in this embodiment of the present invention, the air-fuel ratio A/F is made larger the lower the required torque TQ becomes.

Figure 12A:
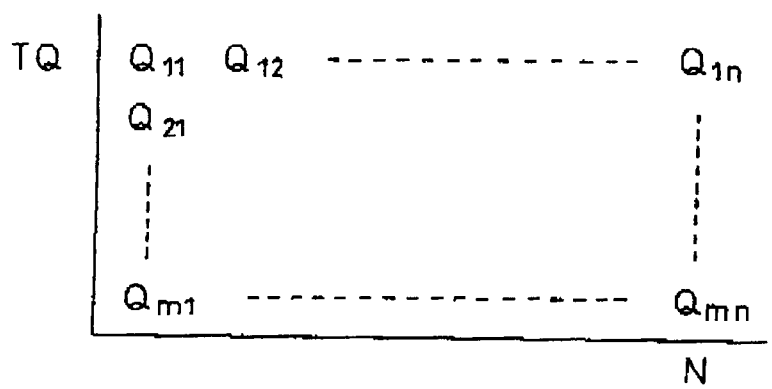
FIGS. 12A and 12B are views of maps of the amount of injection etc.
Figure 12B:
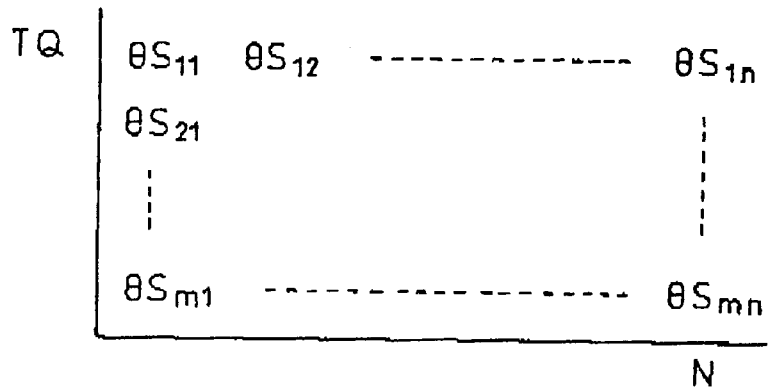

FIG. 12A shows the amount of injection Q in the first operating region, while FIG. 12B shows the injection start timing θS in the first operating region I. The amount of injection Q in the first operating region I is stored in advance in the ROM 42 in the form of a map as a function of the required torque TQ and the engine rotational speed N as shown in FIG. 12A. The injection start timing θS in the first operating region I is stored in advance in the ROM 42 as a function of the required torque TQ and the engine rotational speed N as shown in FIG. 12B.

Figure 13A:
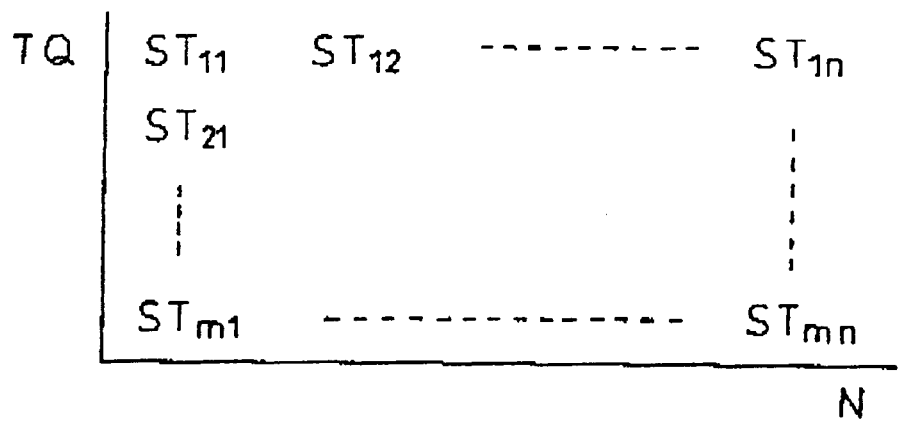
FIGS. 13A and 13B are views of maps of the target opening degree of the throttle valve etc.
Figure 13B:
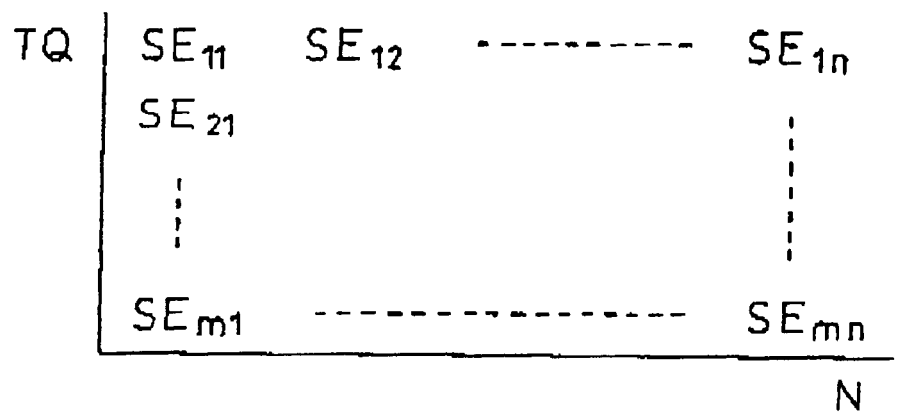

Further, the target opening degree ST of the throttle valve 20 required for making the air-fuel ratio the target air-fuel ratio shown in FIG. 11 is stored in advance in the ROM 42 in the form of a map as a function of the required torque TQ and the engine rotational speed N as shown in FIG. 13A, while the target opening degree SE of the EGR control valve 31 required for making the air-fuel ratio the target air-fuel ratio shown in FIGS. 11 is stored in advance in the ROM 42 in the form of a map as a function of the required torque TQ and the engine rotational speed N as shown in FIG. 13B.

Figure 14:
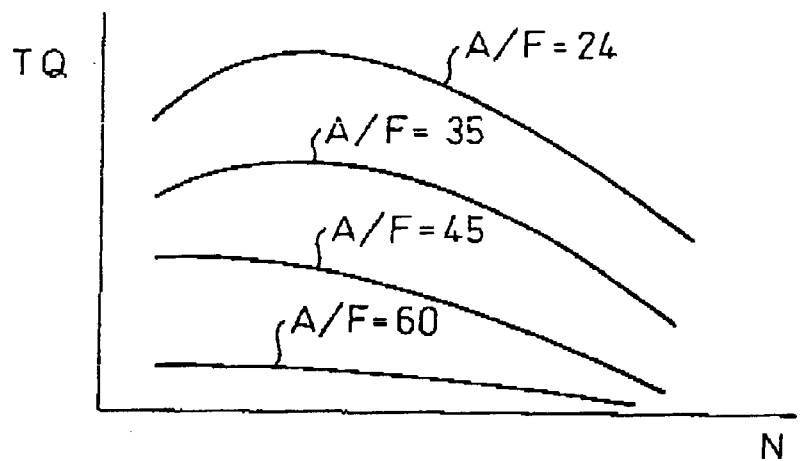
FIG. 14 is a view of the air-fuel ratio in second combustion.

FIG. 14 shows the target air-fuel ratio when second combustion, that is, ordinary combustion by the conventional method of combustion, is performed. Note than in FIG. 14, the curves shown by A/F=24, A/F=35, A/F=45, and A/P=60 show the target air-fuel ratios 24, 35, 45, and 60.

Figure 15A:
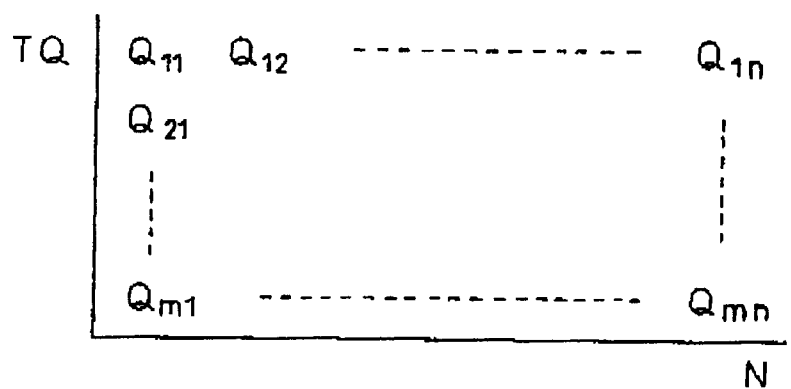
FIGS. 15A and 15B are views of maps of the amount of injection etc.
Figure 15B:
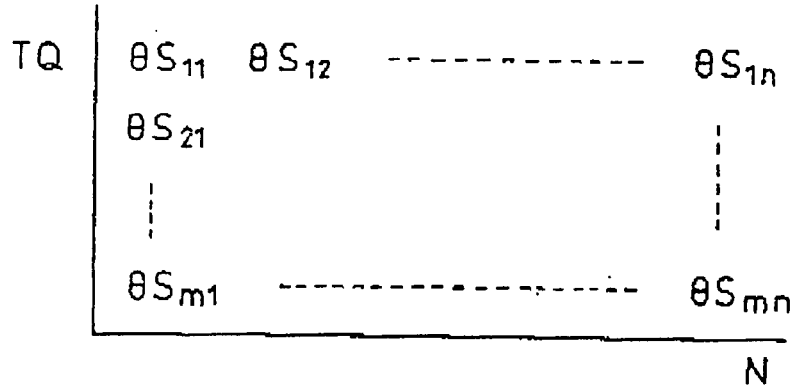

FIG. 15A shows the amount of injection Q in the second operating region II, while FIG. 15B shows the injection start timing θS in the second operating region II. The amount of injection Q in the second operating region II is stored in advance in the ROM 42 in the form of a map as a function of the required torque TQ and the engine rotational speed N as shown in FIG. 15A, while the injection start timing θS in the second operating region II is stored in advance in the ROM 42 in the form of a map as a function of the required torque TQ and the engine rotational speed N as shown in FIG. 15B.

Figure 16A:
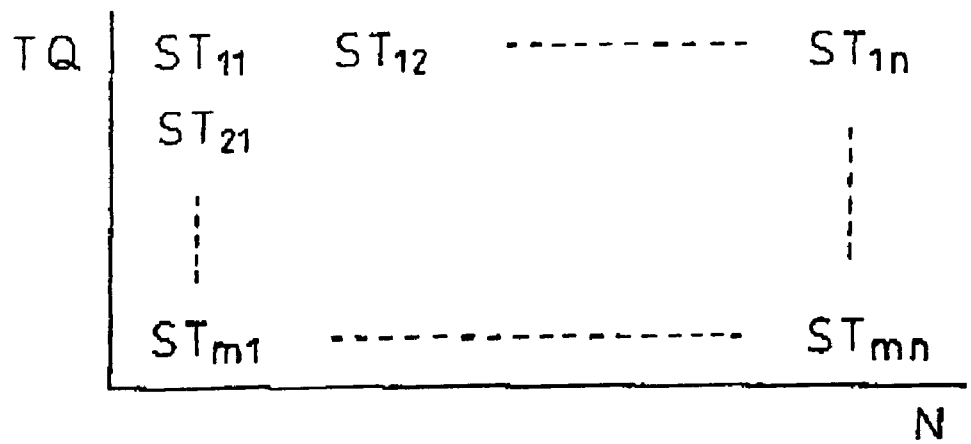
FIGS. 16A and 16B are views of maps of the target opening degree of the throttle valve etc.
Figure 16B:
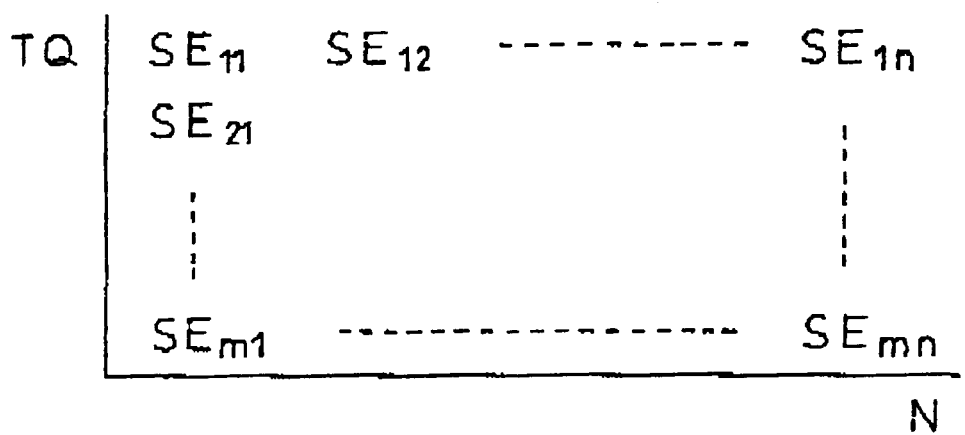

Further, the target opening degree ST of the throttle valve 20 required for making the air-fuel ratio the target air-fuel ratio shown in FIG. 14 is stored in, advance in the ROM 42 in the form of a map as a function of the required torque TQ and the engine rotational speed N as shown in FIG. 16A, while the target opening degree SE of the EGR control valve 31 required for making the air-fuel ratio the target air-fuel ratio shown in FIG. 14 is stored in advance in the ROM 42 in the form of a map as a function of the required torque TQ and the engine rotational speed N as shown in FIG. 16B.

Next, an explanation will be made of the control of the operation with reference to FIG. 17.

Figure 17:
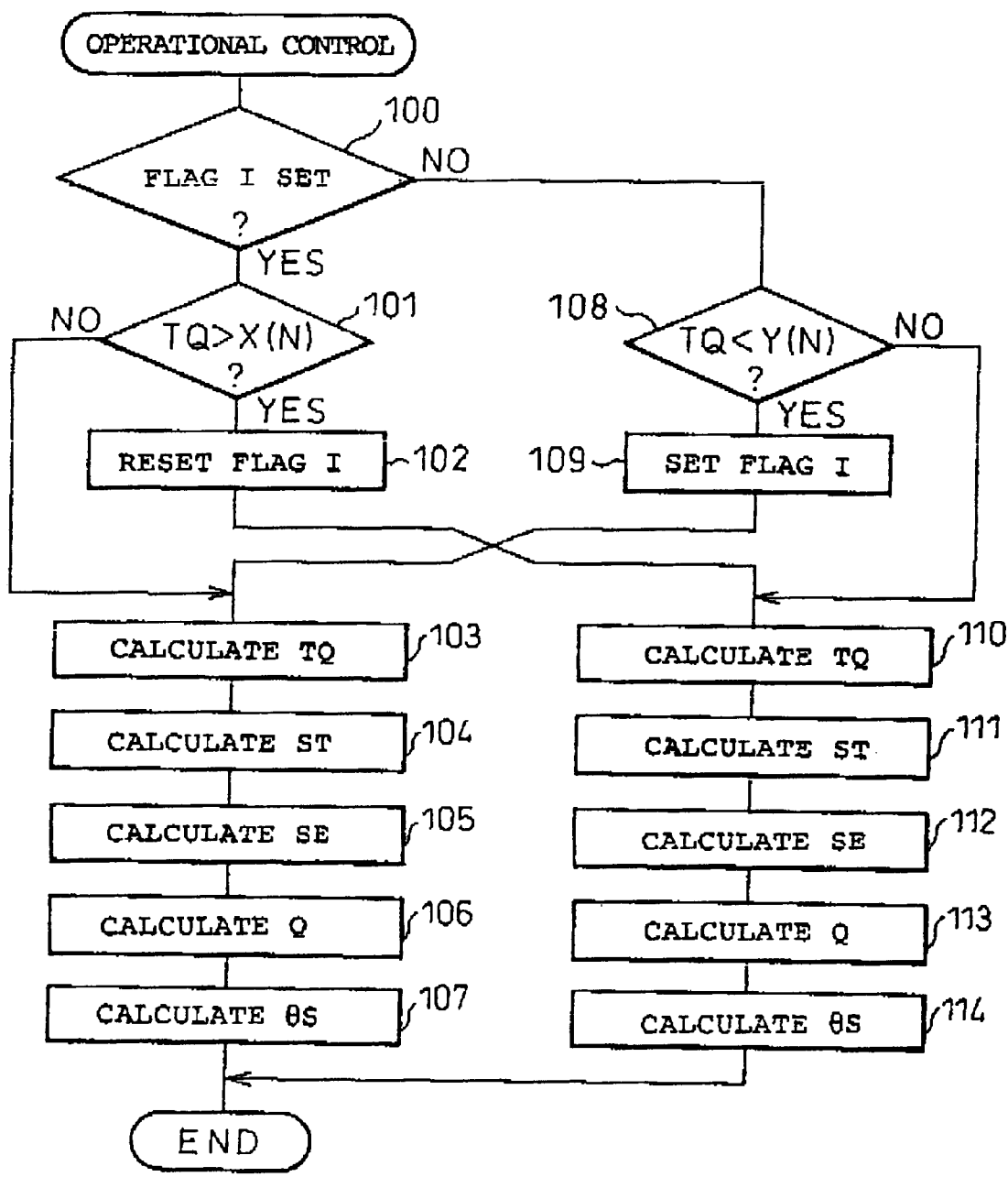
FIG. 17 is a flow chart of the control of the operation of the engine.

Referring to FIG. 17, first, at step 100, it is judged if a flag I showing that the engine operating region is the first operating region I is set or not. When the flag I is set, that is, when the engine operating region is the first operating region I, the routine proceeds to step 101, where it is determined if the required torque TQ has become larger than the first boundary X1(N). When TQ≦X1(N), the routine proceeds to step 103, where low temperature combustion is performed.

That is, at step 103, the required torque TQ is calculated from the map shown in FIG. 10A. Next, at step 104, the target opening degree ST of the throttle valve 20 is calculated from the map shown in FIG. 13A and the opening degree of the throttle valve 20 is made this target opening degree ST. Next, at step 105, the target opening degree SE of the EGR control valve 31 is calculated from the map shown in FIG. 13B and the opening degree of the EGR control valve 31 is made this target opening degree SE. Next, at stop 106, the amount of injection Q is calculated from the map shown in FIG. 12A. Next, at step 107, the injection start timing θS is calculated from the map shown in FIG. 12B.

On the other hand, when it is determined at step 101 that TQ>X1(N), the routine proceeds to step 102, where the flag I is reset, then the routine proceeds to step 110, where the second combustion is performed.

That is, at step 110, the required torque TQ is calculated from the map shown in FIG. 10B. Next, at step 111, the target opening degree ST of the throttle valve 20 is calculated from the map shown in FIG. 16A and the opening degree of the throttle valve 20 is made this target opening degree ST. Next, at step 112, the target opening degree SE of the EGR control valve 31 is calculated from the map shown in FIG. 16B and the opening degree of the EGR control valve 31 is made this target opening degree SE. Next, at step 113, the amount of injection Q is calculated from the map shown in FIG. 15A. Next, at step 114, the injection start timing θS is calculated from the map shown in FIG. 15B.

When the flag I is reset, at the next processing cycle, the routine proceeds from step 100 to step 108, where it is determined if the required torque TQ has become lower than the second boundary Y(N). When TQ≧Y(N), the routine proceeds to step 110, where the second combustion is performed. On the other hand, when it is determined at step 108 that TQ<Y(N), the routine proceeds to step 109, where the flag I is set, then the routine proceeds to step 103, where low temperature combustion is performed.

Next, an explanation will be given of a second embodiment with reference to FIG. 18 to FIG. 20.

Figure 18:
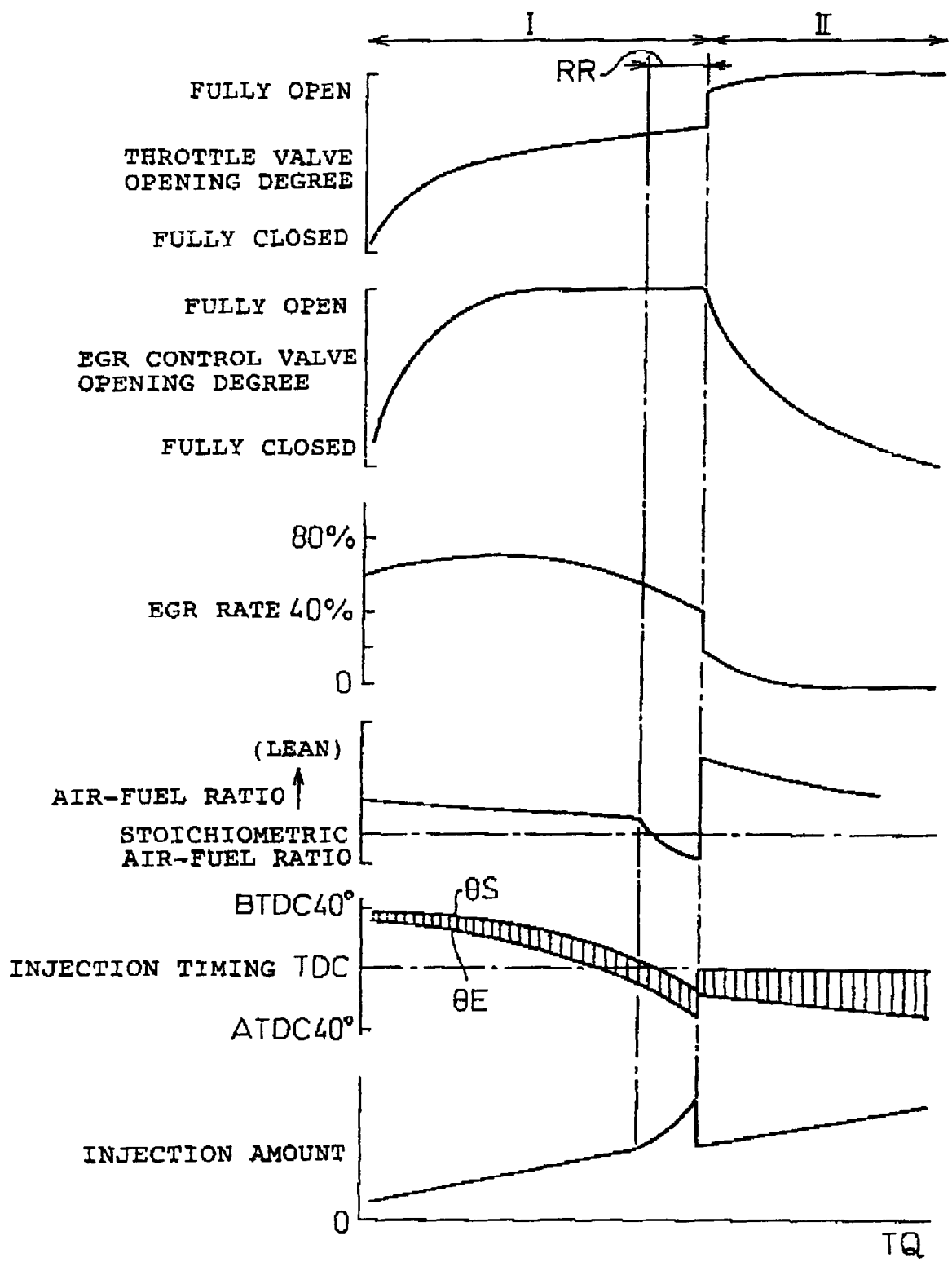
FIG. 18 is a view of the opening degree of the throttle valve etc.

As shown in FIG. 18, in this embodiment as well, in the region AR, the larger the required torque TQ, the more delayed the injection start timing θS. At the high required torque side of the region RR, the injection start timing θS becomes after top dead center. Further, in this embodiment as well, in the region RR, the EGR rate is made lower the larger the required torque TQ by increasing the amount of injection. In this embodiment, however, in the region RR, the air-fuel ratio is made gradually smaller from the lean air-fuel ratio to the rich air-fuel ratio as the required torque TQ becomes larger. Therefore, the rate of increase of the amount of injection in the region RR is made larger in the case of the second embodiment shown in FIG. 18 compared with the embodiment shown in FIG. 9.

Figure 19:
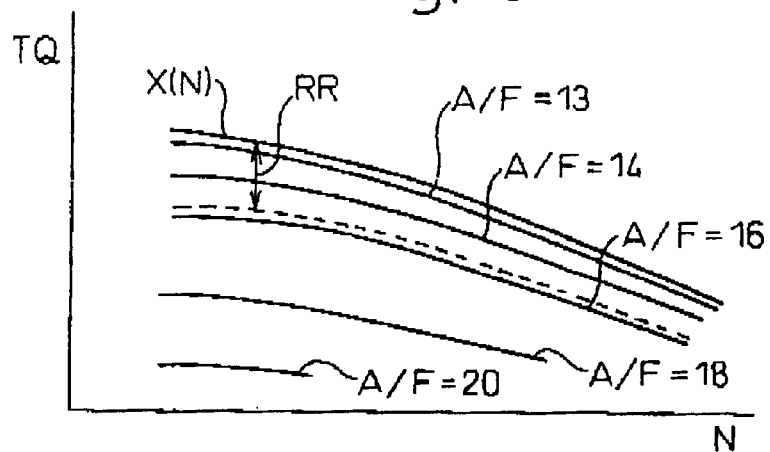
FIG. 19 is a view of the air-fuel ratio in the first operating region I.

FIG. 19 shows the air-fuel ratio A/F in the first operating region I in the second embodiment. In FIG. 19, the curves shown by A/F=13, A/P=14, A/F=16, A/F=18, and A/F=20 show when the air-fuel ratio is 13, 14, 16, 18, and 20, respectively. The air-fuel ratios between the curves are determined by proportional distribution. In this embodiment as well, as shown in FIG. 19, in the first operating region I other than the region RR, the air-fuel ratio becomes lean. Further, in the first operating region I, the air-fuel ratio A/F is made lean the lower the required torque TQ becomes.

Figure 20:
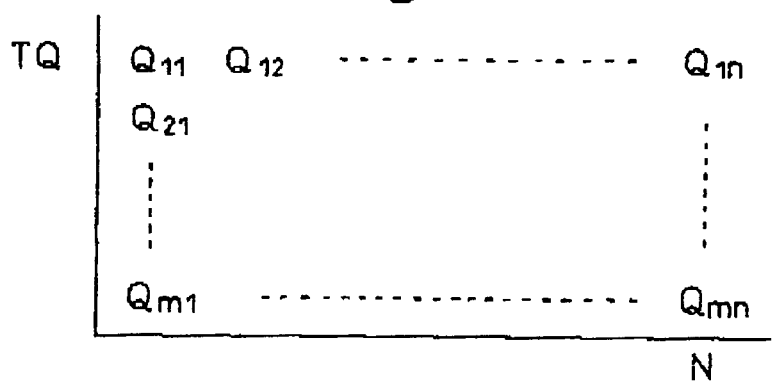
FIG. 20 is a view of a map of the amount of injection.

FIG. 20 shows the amount of injection Q in the first operating region. The amount of injection Q in the first operating region I is stored in advance in the ROM 42 in the form of a map as a function of the required torque TQ and the engine rotational speed N as shown in FIG. 20. Note that in the second embodiment, the injection start timing θS, the target opening degree ST of the throttle valve 20, and the target opening degree SE of the EGR control valve 31 are calculated from the maps shown in FIG. 12B, FIG. 13A, and FIG. 13B.

In this embodiment, when switching from the first combustion to the second combustion or from the second combustion to the first combustion, the air-fuel ratio is made rich and the injection start timing θS is delayed to after top dead center. In this way, there is the advantage that when the air-fuel ratio is made rich, while the amount of fuel consumption increases somewhat, no smoke is produced at all.

Further, making the air-fuel ratio rich at the time of switching between the first combustion and second combustion gives other actions when using an $NO_x$ absorbent as the catalyst 25. This will be explained next.

As explained above, the $NO_x$ absorbent 25 has the function of absorbing $NO_x$ when the mean air-fuel ratio in the combustion chamber 5 is lean, while releasing $NO_x$ when the mean air-fuel ratio in the combustion chamber 5 becomes rich. Explaining this a little more strictly, if the ratio of the air and fuel (hydrocarbons) supplied into the engine intake passage, combustion chamber 5, and exhaust passage upstream of the $NO_x$ absorbent 25 is referred to as the air-fuel ratio of the exhaust gas flowing into the $NO_x$ absorbent 25, then the $NO_x$ absorbent 25 performs an $NO_x$ absorption and release action in which it absorbs $NO_x$ when the air-fuel ratio of the inflowing exhaust gas is lean while releases the absorbed $NO_x$ when the air-fuel ratio of the inflowing exhaust gas becomes the stoichiometric air-fuel ratio or rich.

If this $NO_x$ absorbent 25 is placed in the engine exhaust passage, the $NO_x$ absorbent 25 will in actuality perform an $NO_x$ absorption and release action, but there are portions of the detailed mechanism of this absorption and release action which are still not clear. This absorption and release action, however, is considered to be performed by the mechanism shown in FIGS. 21A and 21B. Next, this mechanism will be explained taking as an example the case of carrying platinum Pt and barium Ba on the carrier, but the same mechanism applies even if using another precious metal and alkali metal, alkali earth, or rare earth.

Figure 21A:
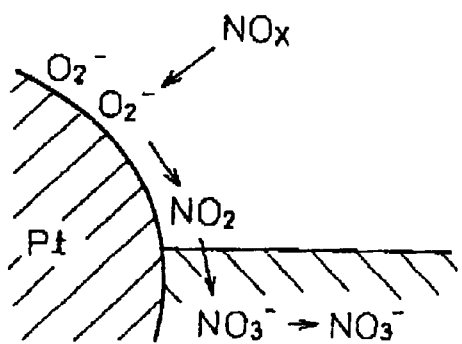
FIGS. 21A and 21B are views for explaining the action of absorption and release of $NO_x$.

In the compression ignition type internal combustion engine shown in FIG. 1, combustion is usually performed when the air-fuel ratio in the combustion chamber 5 is in a lean state. When combustion is performed with the air-fuel ratio in a lean state in this way, the concentration of oxygen in the exhaust gas is high. At this time, as shown in FIG. 21A, the oxygen $O_2$ deposits on the surface of the platinum Pt in the form of $O_2^-$ or $O^{2-}$. On the other hand, the NO in the inflowing exhaust gas reacts with the $O_2^-$ or $O^{2-}$ on the surface of the platinum Pt to become $NO_2$ ($2NO + O_2 \rightarrow 2NO_2$). Next, part of the produced $NO_x$ is oxidized on the platinum Pt and absorbed in the absorbent and diffuses inside the absorbent in the form of nitrate ions $NO_3^-$ as shown in FIG. 21A while bonding with the barium oxide BaO. The $NO_x$ is absorbed in the $NO_x$ absorbent 25 in this way. So long as the concentration of oxygen in the inflowing exhaust gas is high, $NO_2$ is produced on the surface of the platinum Pt. So long as the $NO_x$ absorption capability of the absorbent does not become saturated, the $NO_2$ is absorbed in the absorbent and nitrate ions $NO_3^-$ are produced.

Figure 21B:
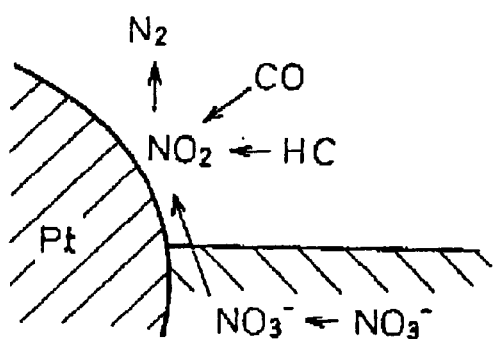

On the other hand, when the air-fuel ratio of the inflowing exhaust gas is made rich, the concentration of oxygen in the inflowing exhaust gas falls and as a result the amount of production of $NO_2$ on the surface of the platinum Pt falls. If the amount of production of $NO_2$ falls, the reaction proceeds in the reverse direction ($NO_3^- \rightarrow NO_2$) and therefore the nitrate ions $NO_2^-$ in the absorbent are released from the absorbent in the form of $NO_2$. At this time, the $NO_x$ released from the $NO_x$ absorbent 25 reacts with the large amount of unburnt hydrocarbons and carbon monoxide contained in the inflowing exhaust gas to be reduced as shown in FIG. 21B. In this way, when there is no longer any $NO_2$ present on the surface of the platinum PT, $NO_2$ is successively released from the absorbent. Therefore, if the air-fuel ratio of the inflowing exhaust gas is made rich, the $NO_x$ will be released from the $NO_x$ absorbent 25 in a short time and, further, the released $NO_x$ will be reduced, so no $NO_x$ will be discharged into the atmosphere.

Note that in this case, even if the air-fuel ratio of the inflowing exhaust gas is made the stoichiometric air-fuel ratio, $NO_x$ will be released from the $NO_x$ absorbent 25. When the air-fuel ratio of the in-flowing exhaust gas is made the stoichiometric air-fuel ratio, however, the $NO_x$ will be released from the $NO_x$ absorbent 25 only gradually, so a somewhat long time will be required for having all of the $NO_x$ absorbed in the $NO_x$ absorbent 25 be released.

Figure 22A:
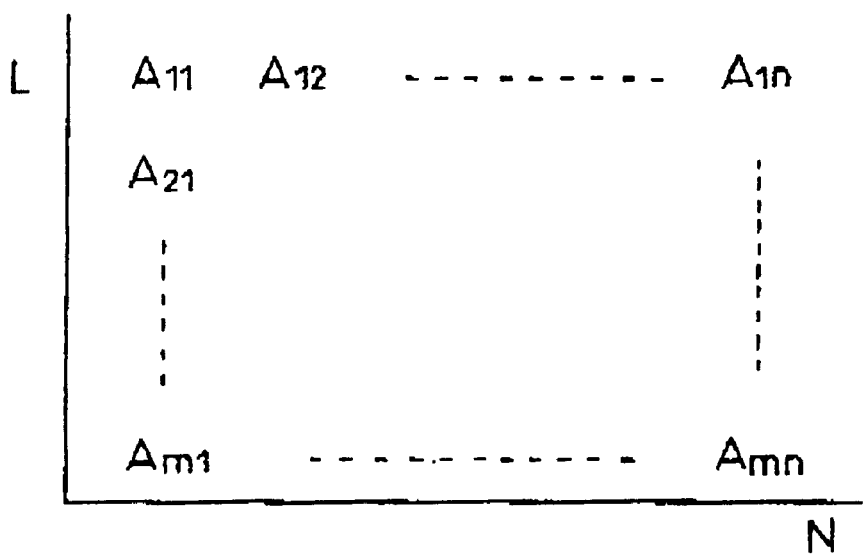
FIGS. 22A and 22B are views of maps of the amount of $NO_x$ absorption per unit time.

There are, however, limits to the $NO_x$ absorption capability of the $NO_x$ absorbent 25. It is necessary to release the $NO_x$ from the $NO_x$ absorbent 25 before the $NO_x$ absorption capability of the $NO_x$ absorbent 25 becomes saturated. Therefore, it is necessary to estimate the amount of $NO_x$ absorbed in the $NO_x$ absorbent 25. Therefore, in this embodiment of the present invention, the amount of $NO_x$ absorption A per unit time when the first combustion is being performed is found in advance in the form of the map shown in FIG. 22A as a function of the required load L and the engine rotational speed N, while the amount of $NO_x$ absorption B per unit time when the second combustion is being performed is found in advance in the form of the map shown in FIG. 22B as a function of the required load L and the engine rotational speed N. The amount $\Sigma NOX$ of $NO_x$ absorbed in the $NO_x$ absorbent 25 is estimated by cumulative addition of these amounts of $NO_x$ absorption A and B per unit time.

In this embodiment according to the present invention, when the amount $\Sigma NOX$ of $NO_x$ absorption exceeds a predetermined maximum allowable value, the $NO_x$ is made to be released from the $NO_x$ absorbent 25. That is, specifically speaking, when $\Sigma NOX \leq MAX$, the air-fuel ratio and the injection start timing θS etc. are controlled as shown in FIG. 9. As opposed to this, when $\Sigma NOX > MAX$, the air-fuel ratio and the injection start timing θS etc. are controlled as shown in FIG. 18. Therefore, at this time, $NO_x$ is released from the $NO_x$ absorbent when the air-fuel ratio is made rich at the time of switching between the first combustion and the second combustion.

Next, an explanation will be made of the processing routine for the $NO_x$ releasing flag which is set when $NO_x$ is to be released, from the $NO_x$ absorbent 25 while referring to FIG. 23. Note that this routine is executed by interruption every predetermined time interval.

Figure 23:
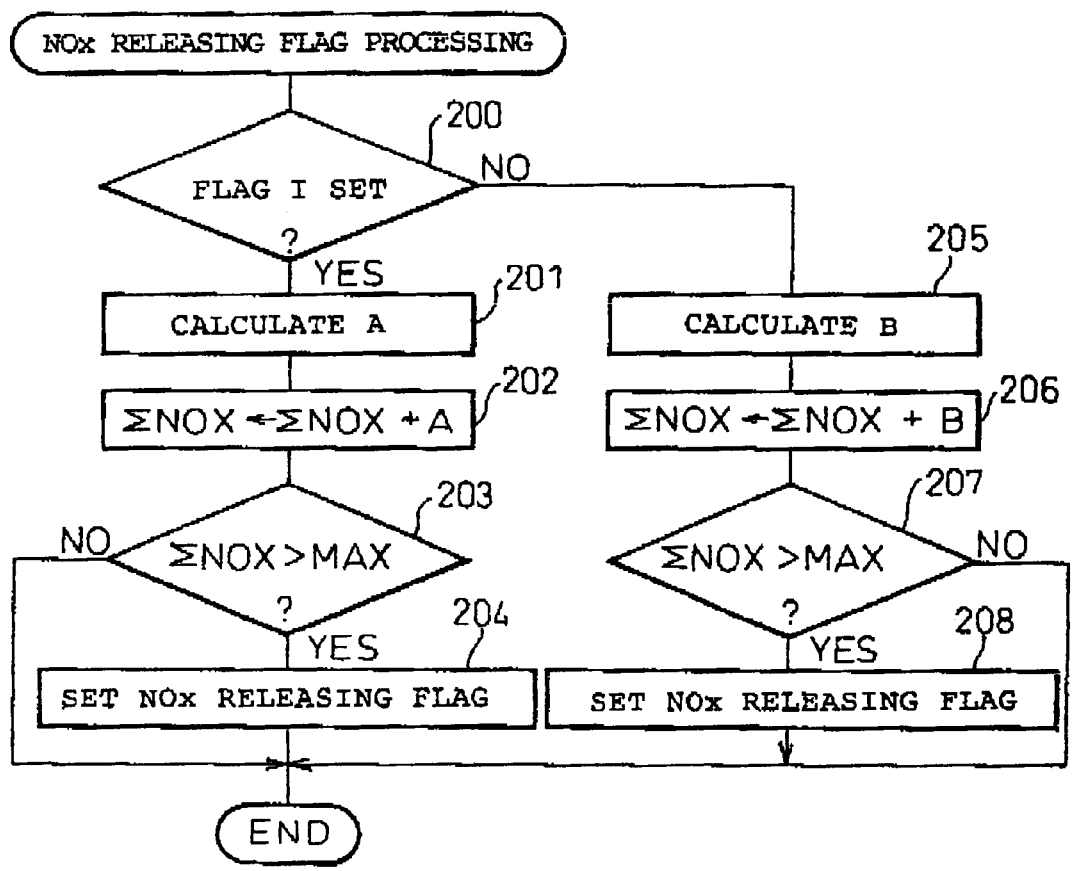
FIG. 23 is a flow chart of the processing of the $NO_x$ release flag.

Referring to FIG. 23, first, at step 200, it is judged if a flag I showing that the engine operating region is the first operating region I is set or not. When the flag I is set, that is, when the engine operating region is the first operating region I, the routine proceeds to step 201, where the amount of absorption of $NO_x$ per unit time is calculated from the map shown in FIG. 22A. Next, at step 202, A is added to the amount ΣNOX of absorption of $NO_x$. Next, at step 203, it is determined if the amount ΣNOX of absorption of $NO_x$ has exceeded a maximum allowable value MAX. If ΣNOX>MAX, the routine proceeds to step 204, where the $NO_x$ releasing flag showing that $NO_x$ should be released is set.

Figure 22B:
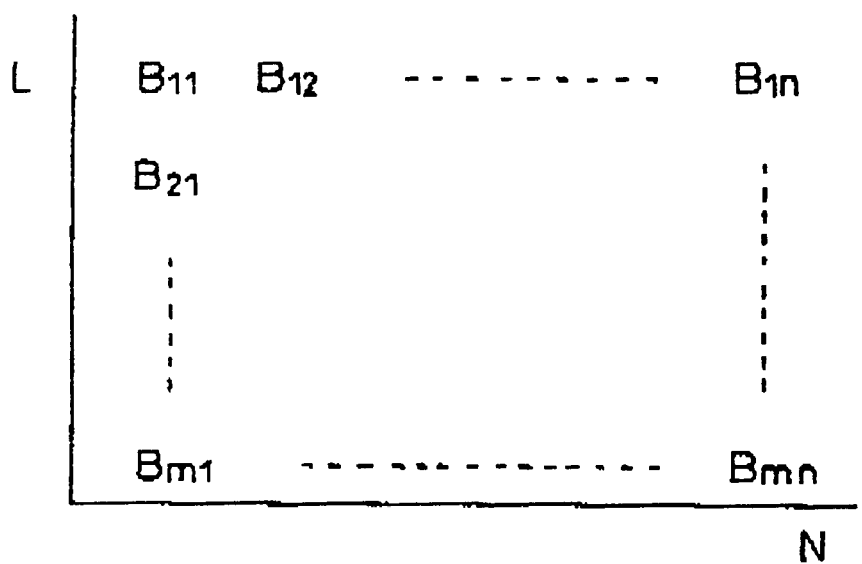

On the other hand, when it is determined at step 200 that the flag I has been reset, that is, when the operating state of the engine is the second operating region II, the routine proceeds to step 205, where the amount B of absorption of $NO_x$ per unit time is calculated from the map shown in FIG. 22B. Next, at step 206, B is added to the amount ΣNOX of the absorption of $NO_x$. Next, at step 207, it is determined if the amount ΣNOX of the absorption of $NO_x$ has exceeded the maximum allowable value MAX. When ΣNOX>MAX1, the routine proceeds to step 208, where the $NO_x$ releasing flag showing that $NO_x$ should be released is set.

Next, an explanation will be made of the operational control with reference to FIG. 24.

Figure 24:
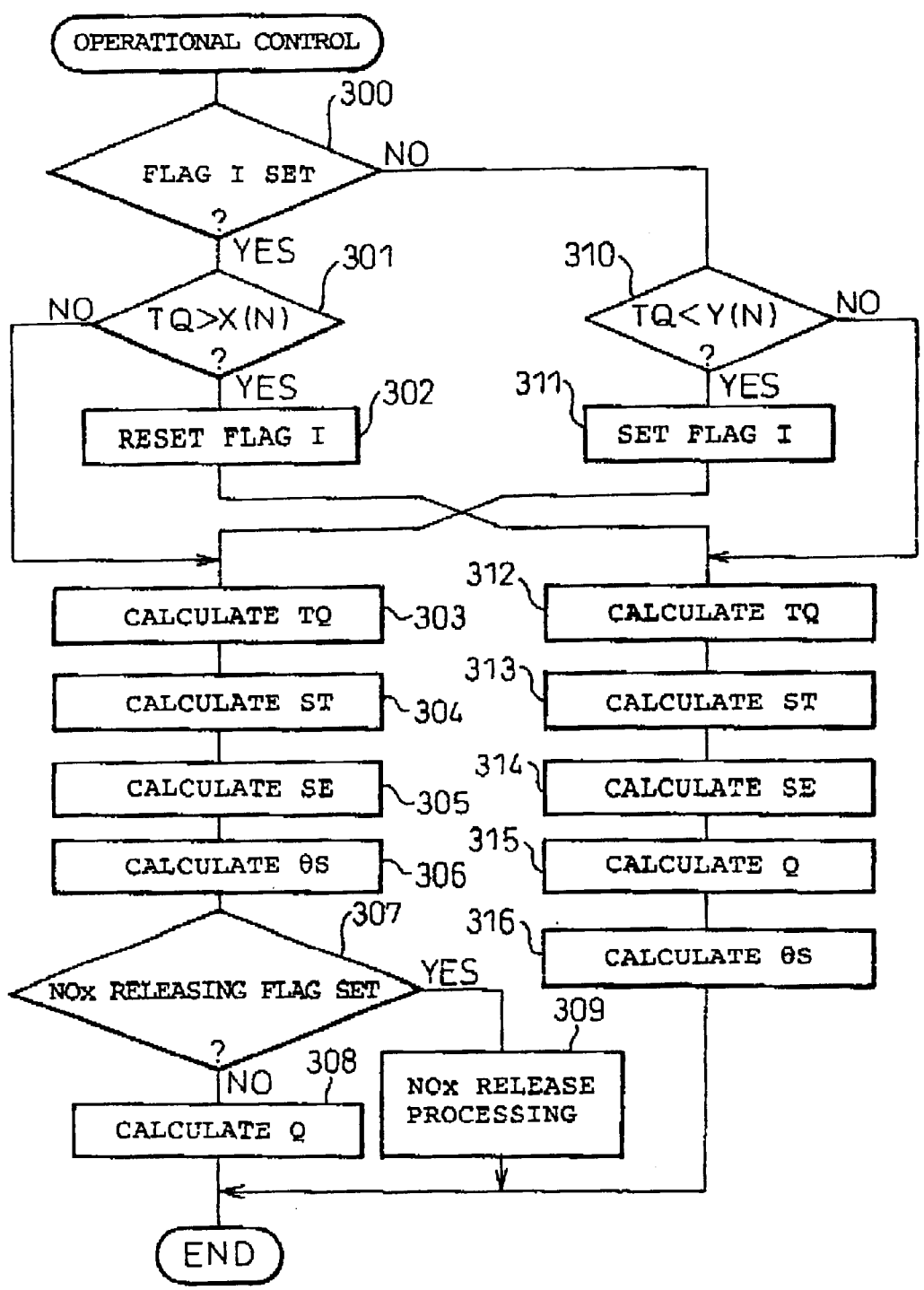
FIG. 24 is a flow chart of the control of the operation of the engine.

Referring to FIG. 24, first, at step 300, it is determined if a flag I indicating the operating state of the engine is the first operating region I has been set or not. When the flag I has been set, that is, when the operating state of the engine is the first operating region I, the routine proceeds to step 301, where it is determined if the required torque TQ has become larger than the first boundary X1(N). When TQ≦X1(N), the routine proceeds to step 303, where low temperature combustion is performed.

That is, at step 303, the required torque TQ is calculated from the map shown in FIG. 10B. Next, at step 304, the target degree of opening ST of the throttle valve 20 is calculated from the map shown in FIG. 13A and the degree of opening of the throttle valve 20 is made this target degree of opening ST. Next, at step 305, the target degree of opening SE of the EGR control valve 31 is calculated from the map shown in FIG. 13B and the degree of opening of the EGR control valve 31 is made this target degree of opening SE. Next, at step 306, the injection start timing θS is calculated from the map shown in FIG. 12B.

Next, at step 307, it is determined if the $NO_x$ releasing flag has been set. When the $NO_x$ releasing flag 1 has not been set, the routine proceeds to step 308, where the amount of injection Q is calculated from the map shown in FIG. 12A. On the other hand, when the $NO_2$ releasing flag has been set, the routine proceeds to step 309, where processing is performed to release $NO_x$ from the $NO_x$ absorbent 25.

That is, at step 309, first, the amount of injection Q is calculated from the map shown in FIG. 20. Next, it is determined if the air-fuel ratio has been made rich for more than a predetermined period. When the air-fuel ratio has been made rich for more than a predetermined period, the $NO_x$ releasing flag 1 is reset.

On the other hand, when it is determined at step 301 that TQ>X(N), the routine proceeds to step 302, where the flag I is reset, then the routine proceeds to step 312, where the second combustion is performed.

That is, at step 312, the required torque TQ is calculated from the map shown in FIG. 10B. Next, at step 313, the target opening degree ST of the throttle valve 20 is calculated from the map shown in FIG. 16A and the opening degree of the throttle valve 20 is made this target opening degree ST. Next, at step 314, the target opening degree SE of the EGR control valve 31 is calculated from the map shown in FIG. 16B and the opening degree of the EGR control valve 31 is made this target opening degree SE. Next, at step 315, the amount of injection Q is calculated from the map shown in FIG. 15A. Next, at step 316, the injection start timing θS is calculated from the map shown in FIG. 15B.

When the flag I is reset, at the next processing cycle, the routine proceeds from step 300.to step 310, where it is determined if the required torque TQ has become lower than the second boundary Y(N). When TQ≧Y(N), the routine proceeds to step 312, where the second combustion is performed. On the other hand, when it is determined at step 310 that TQ<Y(N), the routine proceeds to step 311, where the flag I is set, then the routine proceeds to step 303, where low temperature combustion is performed.

According to the present invention, it is possible to prevent the production of smoke when switching between the first combustion and second combustion.

LIST OF REFERENCE NUMERALS

5 . . . combustion chamber
6 . . . fuel injector
7 . . . suction valve
9 . . . exhaust valve
15 . . . exhaust turbocharger
20 . . . throttle valve
26 . . . catalytic converter
29 . . . EGR passage
31 . . . EGR control valve

What is claimed is:

1. An intirnal combustion engine in which an amount of production of soot gradually increases and then peaks when an amount of inert gas in a combustion chamber increases and in which a further increase of the amount of inert gas in the combustion chamber results in a timperature of fuel and surrounding gas in the combustion chamber becoming lower than a temperature of production of soot and therefore almost no production of soot any longer, said engine comprising swiching means for silectively switching between a first combustion where the amount of the inert gas in the combustion chamber is larger then the amount of inert gas where the amount of production of inert gas in the combustion chamber is smaller than the amount of inert gas where the amount of production of soot speaks, and ijection start timing being delayed until after top dead center of a compression stroke when swiching between the first combustion and second combustion.

2. An internal combustion engine as set forth in claim 1, wherein when switching between the first combustion and the second combustion, the air-fuel ratio is made lean or the stoichiometric air-fuel ratio and the injection start timing is delayed until after top dead center of the compression stroke under the first combustion.

3. An internal combustion engine as set forth in claim 1, wherein the operating region of the engine is divided into a low load side first operating region and a high load side second operating region, the first combustion is performed in the first operating region, and the second combustion is performed in the second operating region.

4. An internal combustion engine as set forth in claim 3, wherein in a region in the first operating region where the load is the highest, the air-fuel ratio is made lean or the stoichiometric air-fuel ratio and the injection start timing is delayed until after top dead center of the compression stroke.

5. An internal combustion engine as set forth in claim 4, wherein an exhaust gas recirculation device is provided for recirculating exhaust gas exhausted from the combustion chamber into an intake passage of the engine, the inert gas is comprised of recirculated exhaust gas, the exhaust gas recirculation rate is made more than about 55 percent in the first operating region I other than the region whree the load is the highest, and the exhaust gas recirculation rate is made of less than 55 percent in the region where the load is the highest.

6. An internal combustion engine as set forth in claim 1, wherein a catalyst having an oxidation function is arranged in the engine exhaust passage.

7. An internal combustion engine as set forth in claim 6, wherein the catalyst is comprised of at least one of an oxidation catalyst, three-way catalyst, and $NO_x$ aborbent.

8. An internal combustion engine as set forth in claim 1, wherein when switching between the first combustion and the second combustion, the air-fuel ratio is made rich and the injection start timing is delayed until after top dead center of the compression stroke under the first combustion.

9. An internal combustion engine as set forth in claim 8, wherein the operating of the engine is divided into a low load side first operating region and a high load side second operating region, the first combustion is performed in the first operating region, and the second combustion is performed in the second operating region.

10. An internal combustion engine as set forth in claim 1, wherein in a region in the first operating region where the load is the highest, the air-fuel ratio is made rich and the injection start timing is delayed until after top dead center of the compression stroke.

11. An internal combustion engine as set forth in claim 10, wherein an exhaust gas recirculation device is provided for recirculating exhaust gas exhausted from the combustion chamber into an intake passage of the engine, the inert gas is comprised of recirculated exhaust gas, the exhaust gas recirculation rate is made more than about 55 percent in the first operating region I other then the region where the load is the highest, and the exhaust gas recirculation rate is made less than 55 percent in the region where the load is the highest.

12. An internal combustion engine as set forth in claim 8, wherein a catalyst having an oxidation function is arranged in the engine exhaust passage.

13. An internal combustion engine as set forth in claim 1, wherein an $NO_x$ absorbent is arranged in the engine exhaust passage, the air-fuel ratio is made lean or the stoichiometric air-fuel ratio an the injection start timing is delayed until after top dead center of the compression stroke under first combustion when switching between first combustion and second combustion at normal times, and the air-fuel ratio is made rich and the injection start timing is delayed until after top dead center of the compression stroke under first combustion when switching between first combustion and second combustion when $NO_x$ is to be released from the $NO_x$ absorbent.

* * * * *